United States Patent
Hashimoto

(10) Patent No.: US 9,712,710 B2
(45) Date of Patent: Jul. 18, 2017

(54) SYSTEM, METHOD, AND TERMINAL DEVICE FOR PROVIDING SERVICE

(71) Applicant: Takahiro Hashimoto, Kanagawa (JP)

(72) Inventor: Takahiro Hashimoto, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 14/829,786

(22) Filed: Aug. 19, 2015

(65) Prior Publication Data

US 2015/0358495 A1    Dec. 10, 2015

Related U.S. Application Data

(63) Continuation of application No. 14/194,951, filed on Mar. 3, 2014, now Pat. No. 9,146,697.

(30) Foreign Application Priority Data

Mar. 6, 2013    (JP) ................................ 2013-043889
Feb. 21, 2014    (JP) ................................ 2014-031706

(51) Int. Cl.
    *H04N 1/00*        (2006.01)
    *G06F 3/12*         (2006.01)

(52) U.S. Cl.
    CPC ....... *H04N 1/00925* (2013.01); *G06F 3/1204* (2013.01); *G06F 3/1206* (2013.01);
(Continued)

(58) Field of Classification Search
    CPC ................................................ H04N 1/00925
(Continued)

(56) References Cited

U.S. PATENT DOCUMENTS

| 8,488,170 B2 | 7/2013 | Takata |
| 2002/0063693 A1 | 5/2002 | Aoki et al. |

(Continued)

FOREIGN PATENT DOCUMENTS

| JP | 2005-292903 | 10/2005 |
| JP | 2007-026466 | 2/2007 |

(Continued)

OTHER PUBLICATIONS

Chinese Office Action dated Apr. 18, 2016.

*Primary Examiner* — Jacky X Zheng
(74) *Attorney, Agent, or Firm* — IPUSA, PLLC

(57) ABSTRACT

A system for providing multiple services by using one or more electronic devices connected to the system includes a data processing apparatus, a portable terminal including an obtaining unit that obtains device data from a target electronic device included in the one or more electronic devices, the device data identifying the one or more electronic devices, a receiving part that receives a selection of a target service included in the multiple services, and a determining part that determines whether the target service can be executed by the target electronic device according to the device data obtained from the target electronic device. In a case where the determining part determines that the target service can be executed by the target electronic device, the portable terminal and the data processing apparatus cooperate with each other and control the target electronic device for providing the target service.

20 Claims, 19 Drawing Sheets

(52) U.S. Cl.
CPC .......... *G06F 3/1232* (2013.01); *G06F 3/1247* (2013.01); *G06F 3/1285* (2013.01); *G06F 3/1292* (2013.01); *H04N 1/00* (2013.01)

(58) Field of Classification Search
USPC ................................................ 358/474, 1.15
See application file for complete search history.

(56) References Cited

U.S. PATENT DOCUMENTS

| | | | |
|---|---|---|---|
| 2003/0133146 A1* | 7/2003 | Parry | G06F 3/1204 358/1.15 |
| 2005/0235077 A1 | 10/2005 | Kubota | |
| 2007/0216943 A1 | 9/2007 | Funamizu | |
| 2011/0085196 A1 | 4/2011 | Liu et al. | |
| 2011/0096354 A1* | 4/2011 | Liu | G06F 3/1204 358/1.15 |
| 2012/0026536 A1* | 2/2012 | Shah | G06F 3/1206 358/1.15 |
| 2013/0250358 A1 | 9/2013 | Suzuki | |
| 2014/0016161 A1 | 1/2014 | Yamada | |
| 2014/0016816 A1 | 1/2014 | Yamada | |
| 2014/0019499 A1 | 1/2014 | Arai | |
| 2014/0019859 A1 | 1/2014 | Hashimoto | |

FOREIGN PATENT DOCUMENTS

| | | |
|---|---|---|
| JP | 2011-129054 | 6/2011 |
| JP | 2014-016896 | 1/2014 |
| JP | 2014-016897 | 1/2014 |
| JP | 2014-016898 | 1/2014 |
| JP | 2014-016899 | 1/2014 |

\* cited by examiner

FIG.8

SELECT FOLDER
Data

◁ RETURN

📁 test
xxxx/xx/xx xx:xx:xx       ∧

📁 NEW FOLDER
xxxx/xx/xx xx:xx:xx       ∧

📁 DOCUMENT
xxxx/xx/xx xx:xx:xx       ∧

NUMBER OF FOLDERS:3

CANCEL                    COMPLETE

FIG.9

| SCAN SETTINGS | COMPLETE |
|---|---|
| DOCUMENT TYPE | TEXT/PHOTO (FULL COLOR) > |
| RESOLUTION | 300dpi > |
| DOCUMENT SIDE | SINGLE-SIDE DOCUMENT > |
| DOCUMENT SET DIRECTION | AUTOMATIC DETERMINATION > |
| BLANK PAPER REMOVAL | YES > |
| DOCUMENT SET POSITION | AUTOMATIC DETECTION > |
| FILE FORMAT | PDF > |
| DOUBLE-SIDE DOCUMENT LAST PAGE | DOUBLE-SIDE > |

FIG.13

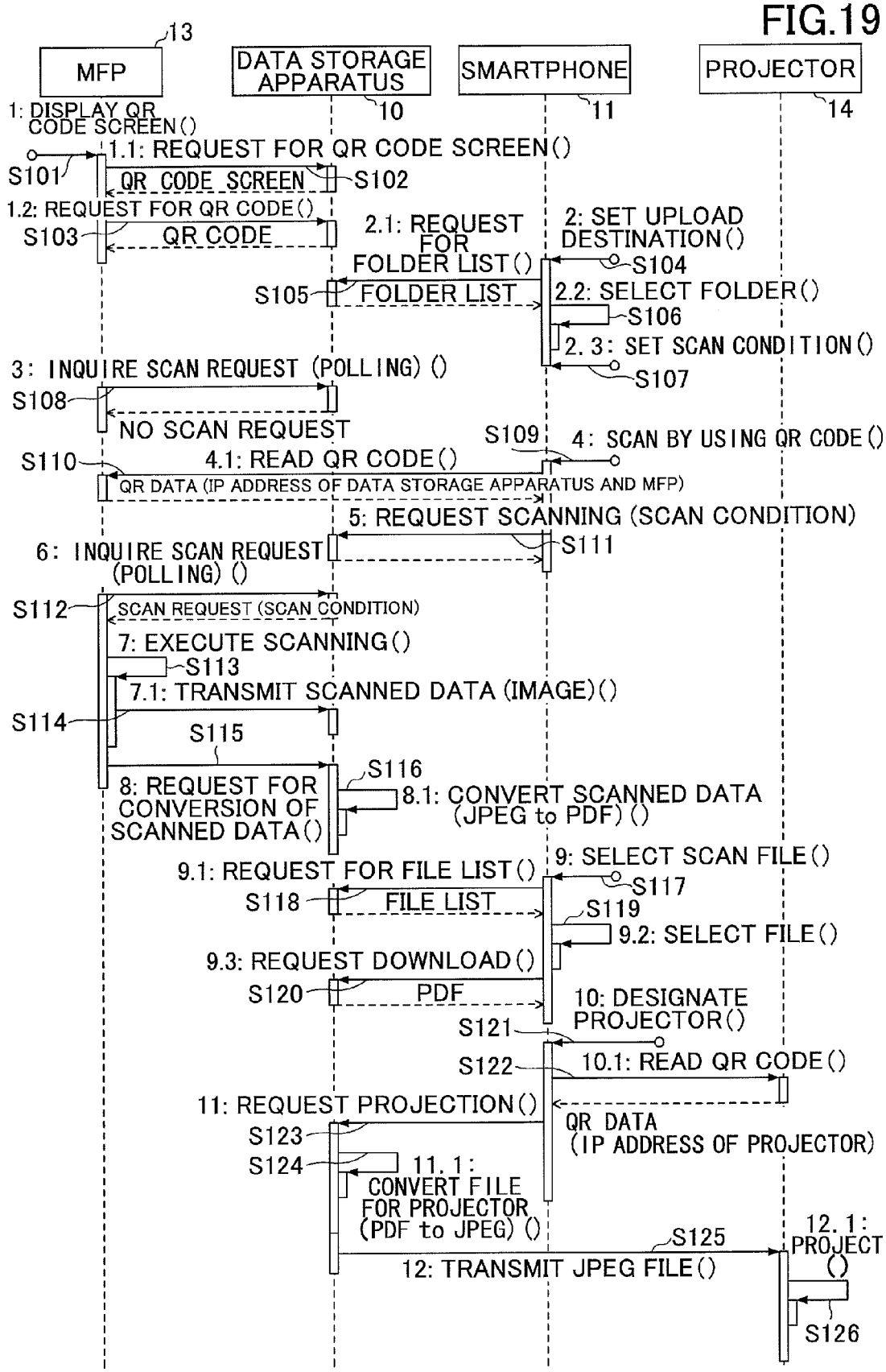

SYSTEM, METHOD, AND TERMINAL DEVICE FOR PROVIDING SERVICE

CROSS-REFERENCE TO RELATED APPLICATIONS

This application is a Continuation Application of the U.S. patent application Ser. No. 14/194,951 filed on Mar. 3, 2014, and is based upon and claims the benefit of priority of the prior Japanese Patent Application Nos. 2013-043889 and 2014-031706 filed on Mar. 6, 2013 and Feb. 21, 2014, respectively, in the Japanese Patent Office, the entire contents of which are incorporated herein by reference.

BACKGROUND OF THE INVENTION

1. Field of the Invention

The present invention relates to a system, a method, and a terminal device for providing one or more services.

2. Description of the Related Art

In a case of instructing a printer to print data stored in a file server, there may be a problem in which the printer is unable to print the data due to insufficient defining of data conversion between the printer and the file server. For example, Japanese Laid-Open Patent Application No. 2005-292903 teaches a control system for solving this problem.

In recent years, a user uses various units of electronic equipment for outputting electronic data (e.g., printer, multi-function machine, projector) and various terminal devices (e.g., mobile phone, smartphone, tablet terminal). The value of a system that utilizes the electronic equipment and terminal devices is expected to increase the more the electronic equipment and the terminal devices are used cooperatively.

However, with the conventional system that utilizes the electronic equipment and the terminal devices, there is no mechanism that allows multiple services to be provided by using one or more units of electronic equipment among the multiple units of electronic equipment connected to the system.

SUMMARY OF THE INVENTION

The present invention may provide a system, a method, and a terminal device for providing a service that substantially obviate one or more of the problems caused by the limitations and disadvantages of the related art.

Features and advantages of the present invention are set forth in the description which follows, and in part will become apparent from the description and the accompanying drawings, or may be learned by practice of the invention according to the teachings provided in the description. Objects as well as other features and advantages of the present invention will be realized and attained by a system, a method, and a terminal device for providing a service particularly pointed out in the specification in such full, clear, concise, and exact terms as to enable a person having ordinary skill in the art to practice the invention.

To achieve these and other advantages and in accordance with the purpose of the invention, as embodied and broadly described herein, an embodiment of the present invention provides a service providing system for providing multiple services by using one or more electronic devices connected to the service providing system, the system including a data processing apparatus, a portable terminal including an obtaining unit configured to obtain device data from a target electronic device included in the one or more electronic devices, the device data identifying the one or more electronic devices, a receiving part configured to receive a selection of a target service included in the multiple services, and a determining part configured to determine whether the target service can be executed by the target electronic device according to the device data obtained from the target electronic device. In a case where the determining part determines that the target service can be executed by the target electronic device, the portable terminal and the data processing apparatus are configured to cooperate with each other and control the target electronic device for providing the target service.

Other objects, features and advantages of the present invention will become more apparent from the following detailed description when read in conjunction with the accompanying drawings.

BRIEF DESCRIPTION OF THE DRAWINGS

FIG. 8 is a schematic diagram illustrating an example of a folder selection screen;

FIG. 9 is a schematic diagram illustrating an example of a scan setting screen;

FIG. 13 is a schematic diagram illustrating an example of a main screen;

FIG. 19 is a sequence diagram illustrating processes performed by an input/output system according to yet another embodiment of the present invention.

DETAILED DESCRIPTION OF THE PREFERRED EMBODIMENTS

Figure 1:
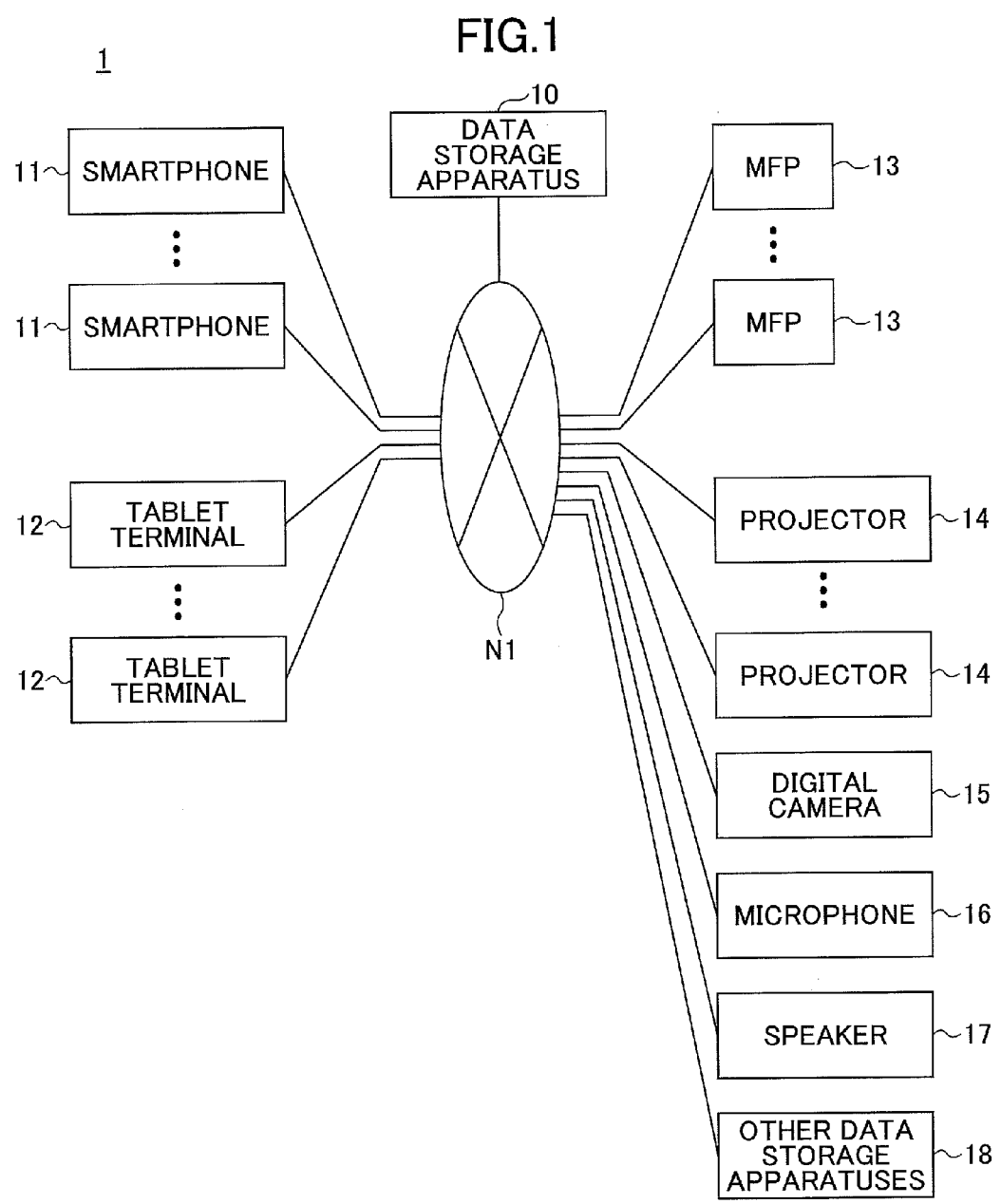
FIG. 1 is a schematic diagram illustrating a configuration of an input/output system according to an embodiment of the present invention.

FIG. 1 is a schematic diagram illustrating a configuration of an input/output system 1 according to an embodiment of the present invention. The input/output system 1 includes a data storage apparatus 10 connected to a network N1 such as a LAN (Local Area Network). The input/output system 1 also includes one or more smartphones 11 and one or more tablet terminals 12 connected to the network N1. Further, the input/output system 1 also includes one or more MFPs (Multi-Function Peripherals) 13 and one or more projectors 14 connected to the network N1. Further, the input/output system 1 may also include a digital camera 15, a microphone 16, a speaker 17, and other data storage apparatuses 18 connected to the network N1. The input/output system 1 is one example of a service providing system.

The network N1 may use a network in a private environment such as a network inside a company. The smartphone 11 and the tablet terminal 12 are examples of a portable terminal 400 carried and operated by a user. Besides the smartphone 11 and the tablet terminal 12, the portable terminal 400 may also be, for example, a mobile phone or a laptop PC (Personal Computer) as long as it is a device that can be carried and operated by a user.

The MFP 13 and the projector 14 are examples of electronic equipment (electronic apparatuses) that perform input/output of electronic data (e.g., printing, scanning, projecting). Further, the digital camera 15, the microphone 16, and the speaker 17 are also examples of the electronic equipment that perform input/output of electronic data. Besides the MFP 13 and the projector 14, the electronic equipment may also be, for example, a printer, a scanner, a copier, and an image display apparatus as long as it is an apparatus that performs input/output of electronic data.

The MFP 13 is an example of an image forming apparatus. The MFP 13 includes, for example, an imaging function, an image forming function, and a communicating function. Thus, the MFP 13 may be used as, for example, a printer, a facsimile machine, a scanner, and a copier. The MFP 13 also includes a Web browser function. Accordingly, the MFP 13 plots (depicts) HTML data stored in the data storage device and displays the plotted data on an UI (User Interface). Further, the MFP 13 allows a Javascript (Registered Trademark) program to operate on the UI. Thereby, the UI can receive requests such as printing requests or scanning requests from the user. The projector 14 is an example of an image projection apparatus. The projector 14 includes, for example, a projecting function and a communicating function.

The data storage apparatus 10 is an example of a data process apparatus. The data storage apparatus 10 can perform high function processes that cannot be performed by the MFP 13 or the projector 14. The data storage apparatus 10 also performs processes of a file server. It is to be noted that the data storage apparatus 10 cooperates with the terminal devices (e.g., smartphone 11, tablet terminal 12) and performs input/output of electronic data by way of the electronic equipment (e.g., MFP 13, projector 14). It is to be noted that the data storage apparatus 10 may be constituted of multiple independent (separate) computers.

<Hardware Configuration>

Figure 2:
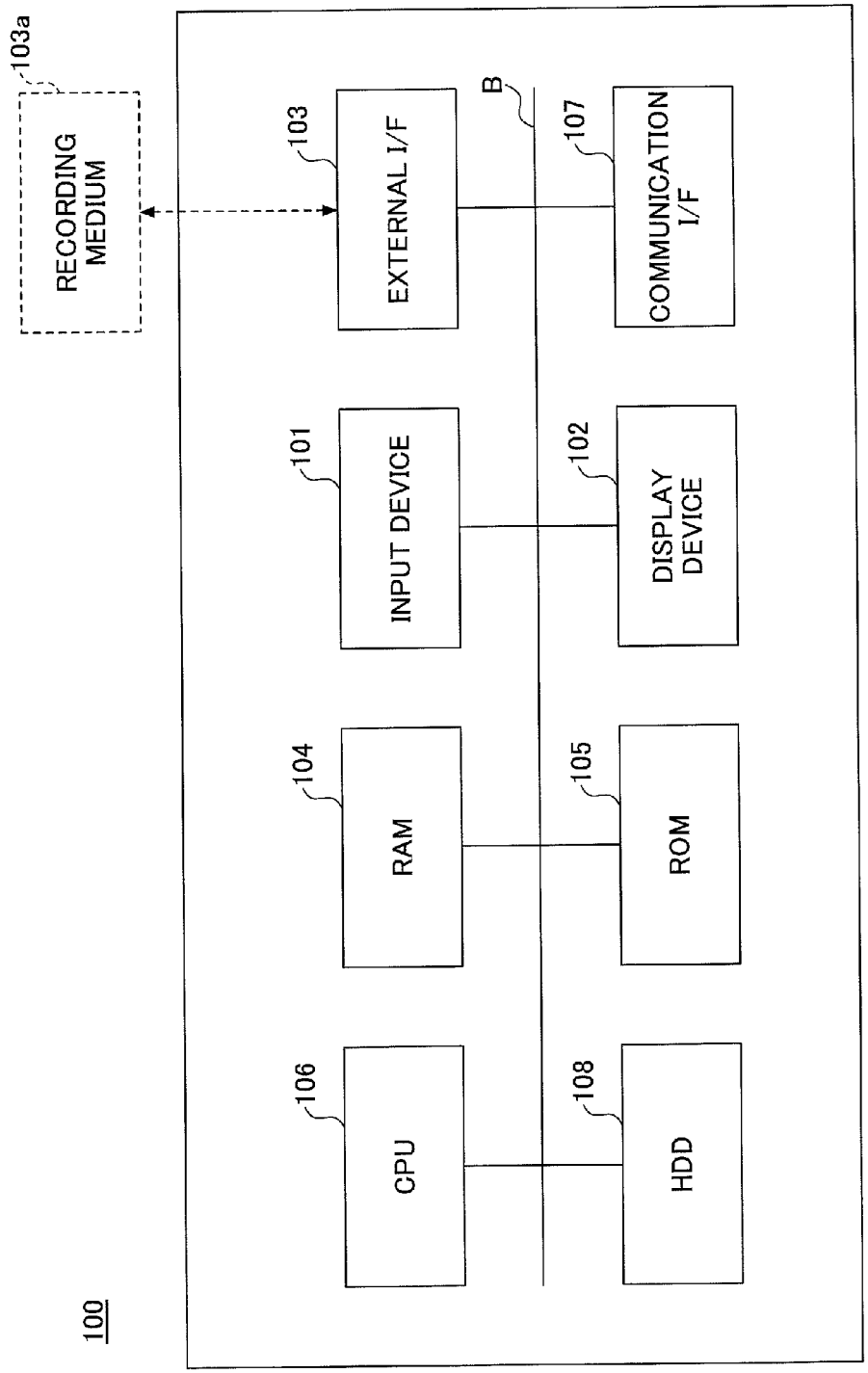
FIG. 2 is a schematic diagram illustrating an example of a hardware configuration of a computer system according to an embodiment of the present invention.

For example, the data storage apparatus 10 may be implemented by a computer system having a hardware configuration illustrated in FIG. 2. It is to be noted that terminal devices such as the smartphone 11 and the tablet terminal 12 also have a hardware configuration illustrated in FIG. 2. FIG. 2 is a schematic diagram illustrating an example of a hardware configuration of a computer system 100 according to an embodiment of the present invention.

The computer system 100 of FIG. 2 includes, for example, an input device 101, a display device 102, an external I/F 103, a RAM (Random Access Memory) 104, a ROM (Read Only Memory) 105, a CPU (Central Processing Unit) 106, a communication I/F (interface) 107, and a HDD (Hard Disk Drive) 108 that are connected to each other by a bus B. The input device 101 includes, for example, a keyboard and a mouse. The input device 101 is used for inputting operation signals to the computer system 100.

The display device 102 includes, for example, a display. The display device 102 displays process results of the computer system 100. The communication I/F 107 is an interface that connects the computer system 100 to the network N1. Accordingly, the computer system 100 can perform data communications with, for example, other portable terminals 400 and electronic devices via the communication I/F 107.

The HDD 108 is a non-volatile storage apparatus that stores, for example, programs and data therein. The programs and data stored in the HDD 108 include, for example, basic software for controlling the entire computer system 100 (e.g., Operating System (OS)) and application software for providing various functions by way of the OS. Further, the HDD 108 manages its stored programs and data by using a predetermined file system and/or a database (DB).

The external I/F 103 is an interface for, for example, an external apparatus provided outside the computer system 100. The external apparatus may be, for example, a recording medium 103a. Accordingly, the computer system 100 can read/write data from/to the recording medium 103a via the external I/F 103. It is to be noted that the recording medium 103a includes, for example, a flexible disk, a CD (Compact Disk), a DVD (Digital Versatile Disk), an SD (Secure Digital) memory card, and a USB (Universal Serial Bus) memory.

The ROM 105 is a non-volatile semiconductor memory (storage device) that can maintain programs and data stored therein even when not powered. The ROM 105 stores programs/data pertaining to BIOS (Basic Input/Output System) that is executed when activating the computer system 100, programs/data pertaining to OS settings, and programs/data pertaining to network settings therein.

The CPU 106 is a processor (arithmetic unit) that implements the entire controls and functions of the computer system 100 by reading out programs and data from storage devices (e.g., ROM 105, HDD 108), loading the programs and data into the RAM 104, and executing various processes according to the programs and data.

With the above-described embodiment of the hardware configuration of the computer system 100, the computer system 100 can implement the various processes described below.

<Portable Terminal>

Figure 3:
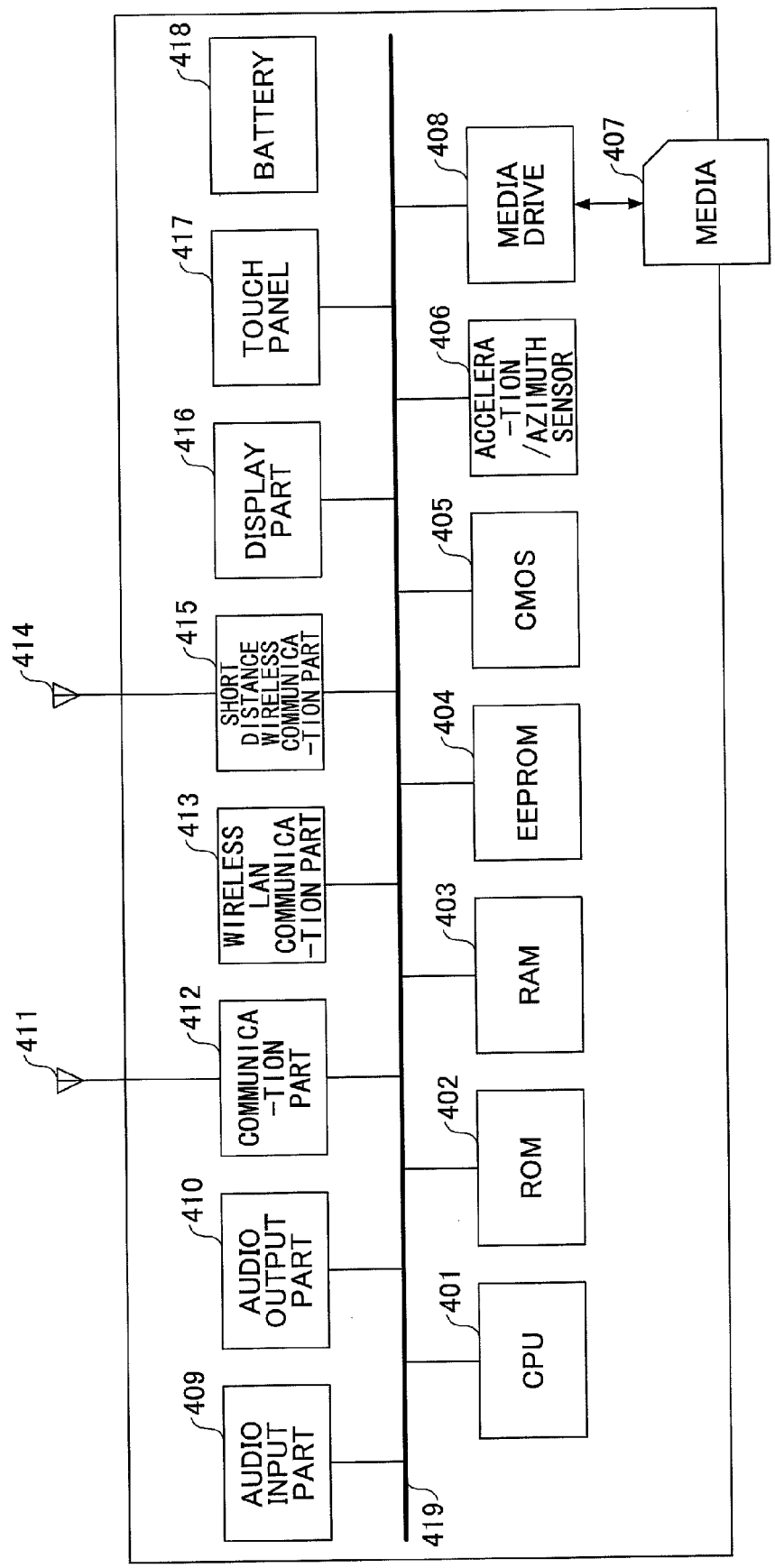
FIG. 3 is a schematic diagram illustrating an example of a hardware configuration of a portable terminal according to an embodiment of the present invention.

FIG. 3 is a schematic diagram illustrating an example of a hardware configuration of a portable terminal 400 according to an embodiment of the present invention. The portable terminal 400 of FIG. 3 includes, for example, a CPU 401, a ROM 402, a RAM 403, an EEPROM (Electrically Erasable Read Only Memory) 404, a CMOS sensor 405, an acceleration/azimuth sensor 406, and a media drive 408.

The CPU 401 controls the entire operations of the portable terminal 400. The ROM 402 stores basic input/output programs therein. The RAM 403 is used as a work area of the CPU 401. The EEPROM 404 reads out and writes data according to the controls of the CPU 401. The CMOS sensor 405 images an object and obtains image data of the object. The acceleration/azimuth sensor 406 includes, for example, an electromagnetic compass or a gyrocompass that detects terrestrial magnetism or an acceleration sensor. The media drive 408 controls reading/writing (storing) of data with respect to various recording media 407 such as flash memory. The recording media 407 may be detachably attached to the media drive 408, so that data recorded in the recording media 407 can be read from the recording media 407 and/or new data can be written (stored) into the recording media 407.

It is to be noted that the EEPROM 404 stores, for example, association data used for network settings and OS data executed by the CPU 401. In this embodiment, an application used for executing a cooperation service (hereinafter also referred to as "cooperation application") is stored in the EEPROM 404 or the recording media 407.

Further, the CMOS sensor 405 is not limited to a CMOS sensor but may be other types of sensors such as a CCD (Charge Coupled Device) sensor as long as the sensor can convert light into electric charges for digitizing an image of an object.

Further, the portable terminal 400 includes, for example, an audio input part 409, an audio output part 410, an antenna 411, a communication part 412, a wireless LAN communication part 413, a short distance wireless communication antenna 414, a short distance wireless communication part 415, a display part 416, a touch panel 417, and a bus line 419.

The audio input part 409 converts sound into audio signals. The audio output part 410 converts audio signals into sound. The communication part 412 transmits/receives wireless signals with a nearest base station by using the antenna 411. The wireless LAN communication part 413 performs short distance wireless communications (e.g., Bluetooth (registered trademark) communications) by using the short distance wireless communication antenna 414.

The display part 416 may be, for example, a liquid crystal display or an organic electro-luminescence display. The display part 416 may display, for example, an image of an object and various icons. The touch panel 417 may be, for example, a pressure sensitive panel or a electrostatic type panel arranged on the display part 416. The touch panel 417 detects a location (touch position) on the display part 416 in accordance with a touch by a finger, a pen, or the like. The bus line 419 may be, for example, an address bus or a data bus for electrically connecting the aforementioned parts and components of the portable terminal 400.

Further, the portable terminal 400 also includes a battery 418 dedicated for the portable terminal 400. The portable terminal 400 is driven by the battery 418. It is to be noted that the audio input part 409 includes a microphone into which sound is input. The audio output part 410 includes a speaker from which sound is output.

With the above-described embodiment of the hardware configuration of the portable terminal 400, the portable terminal 400 can implement the various processes described below.

<Software Configuration>
<<Data Storage Apparatus>>

Figure 4:
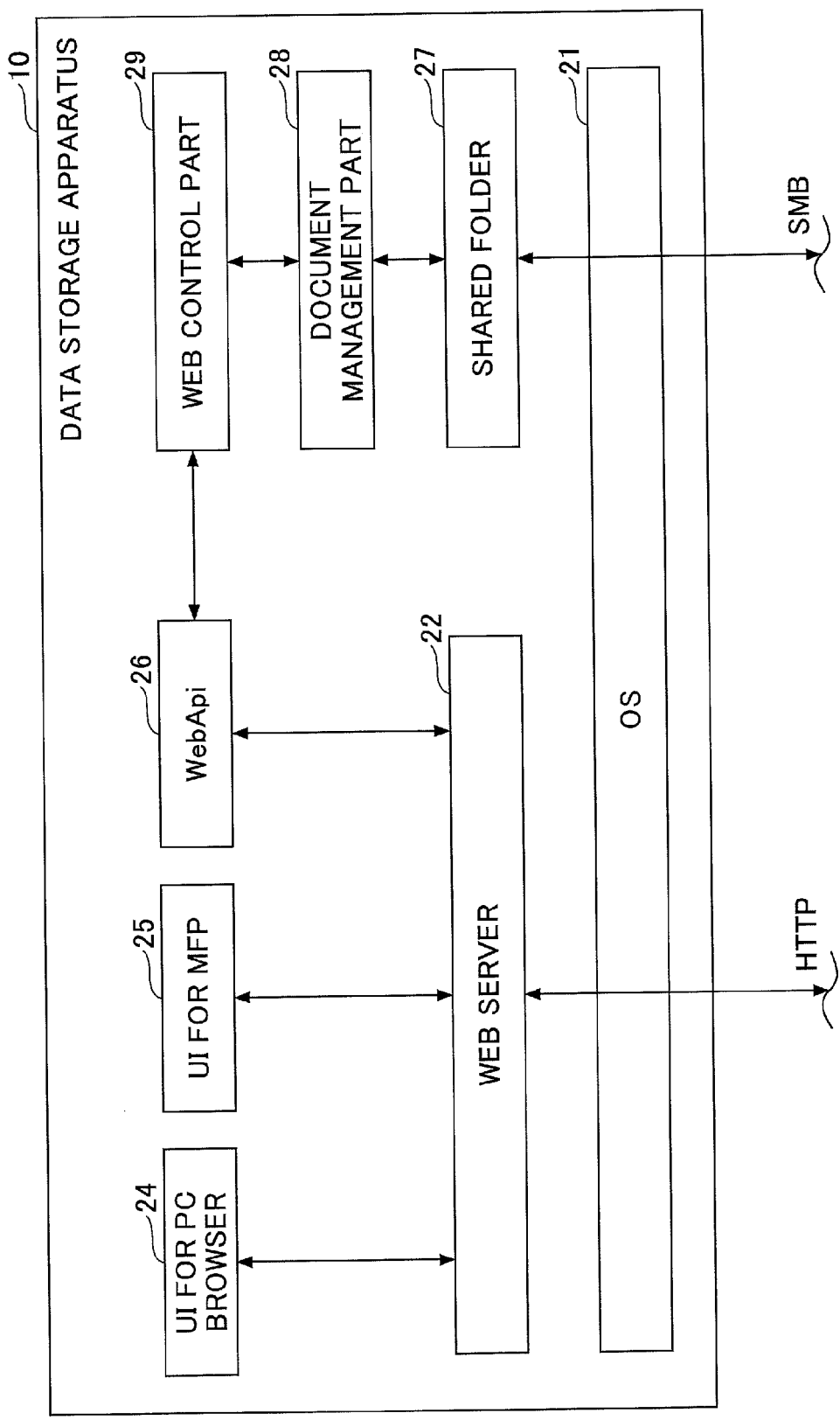
FIG. 4 is a block diagram illustrating process parts of a data storage apparatus according to an embodiment of the present invention.

The data storage apparatus 10 according to an embodiment of the present invention is implemented with, for example, the process parts illustrated in the block diagram of FIG. 4. FIG. 4 is a block diagram illustrating process parts of the data storage apparatus 10 according to an embodiment of the present invention. The data storage apparatus 10 executes a program(s) to implement the processes of an OS 21, a Web server 22, a UI for a PC browser (PC browser UI) 24, a UI for an MFP (MFP UI) 25, a Web API (Application Programming Interface) 26, a shared folder 27, a document management part 28, and a Web control part 29 by way of a processor.

The OS 21 is an operating system of the data storage apparatus 10. The OS 21 controls the entire system of the data storage apparatus 10. The OS 21 may be, for example, Windows (registered trademark) or Linux (registered trademark).

The Web server 22 is software that transmits/receives data by using HTTP (Hyper Text Transfer Protocol). The Web server 22 may be, for example, Apache Tomcat (registered trademark) or IIS (Internet Information Services, registered trademark).

The PC browser UI 24 displays a system setting screen on a portable terminal 400 in accordance with an HTTP request. The user uses a Web browser (not illustrated) to perform changes of settings by way of the system setting screen.

The MFP UI 25 displays a code data screen on an electronic device such as the MFP 13 in accordance with an HTTP request. An example of the code data displayed on the code data screen is a QR code (registered trademark). The QR code is a matrix-type two-dimensional code. Further, the MFP UI 25 also displays, for example, a printing screen or a scanning screen in accordance with a HTTP request. The user uses a Web browser function of the MFP 13 to instruct, for example, the MFP 13 to perform a printing process or a scanning process.

The Web API 26 can be used via the network N1. The Web API 26 receives (accepts) an HTTP request, performs a process corresponding to the HTTP request, and transmits an HTTP response. The Web API 26 also generates a QR code.

The Web API 26 is an interface that is predefined for receiving a request from a portable terminal 400 such as the smartphone 11 and the tablet terminal 12. The Web API 26 is constituted by, for example, functions and classes.

Further, the Web API 26 of the data storage apparatus 10 can be provided to a developer of an application installed in a portable terminal 400 as a SDK (Software Development Kit). The developer of the application can develop an application by using the SDK. The SDK may also be provided to an entity (third party vendor) other than the provider of the data storage apparatus 10. Accordingly, the third party vendor can develop an application by using the SDK. The application developed by using the SDK can be installed in a portable terminal 400.

By providing the Web API 26 of the data storage apparatus 10 as an SDK, not only an application developed by a provider of the data storage apparatus 10 can be installed in a portable terminal 400 but also an application developed by a third party vendor or the like can be installed in the portable terminal 400.

The shared folder 27 is a folder that is made available on the network N1 by using a SMB (Server Message Block) protocol. The user can access the shared folder by using a portable terminal 400 such as the smartphone 11 or the tablet terminal 12.

The document management part 28 manages a file placed in the shared folder 27 and performs a data conversion process in accordance with a request from the Web control part 29. In this embodiment, a file is one form of electronic data. The Web control part 29 controls the document management part 28 in accordance with a request from the Web API 26.

The processes performed by the data storage apparatus 10 can be further divided into two processes. The first process includes the processes performed by the Web server 22, the PC browser UI 24, the MFP UI 25, and the Web API 26. The second process includes the processes performed by the shared folder 27, the document management part 28, and the Web control part 29. Accordingly, the Web API 26 and the Web control part 29 exchange (communicate) processes with each other.

<<Portable Terminal>>

Figure 5:
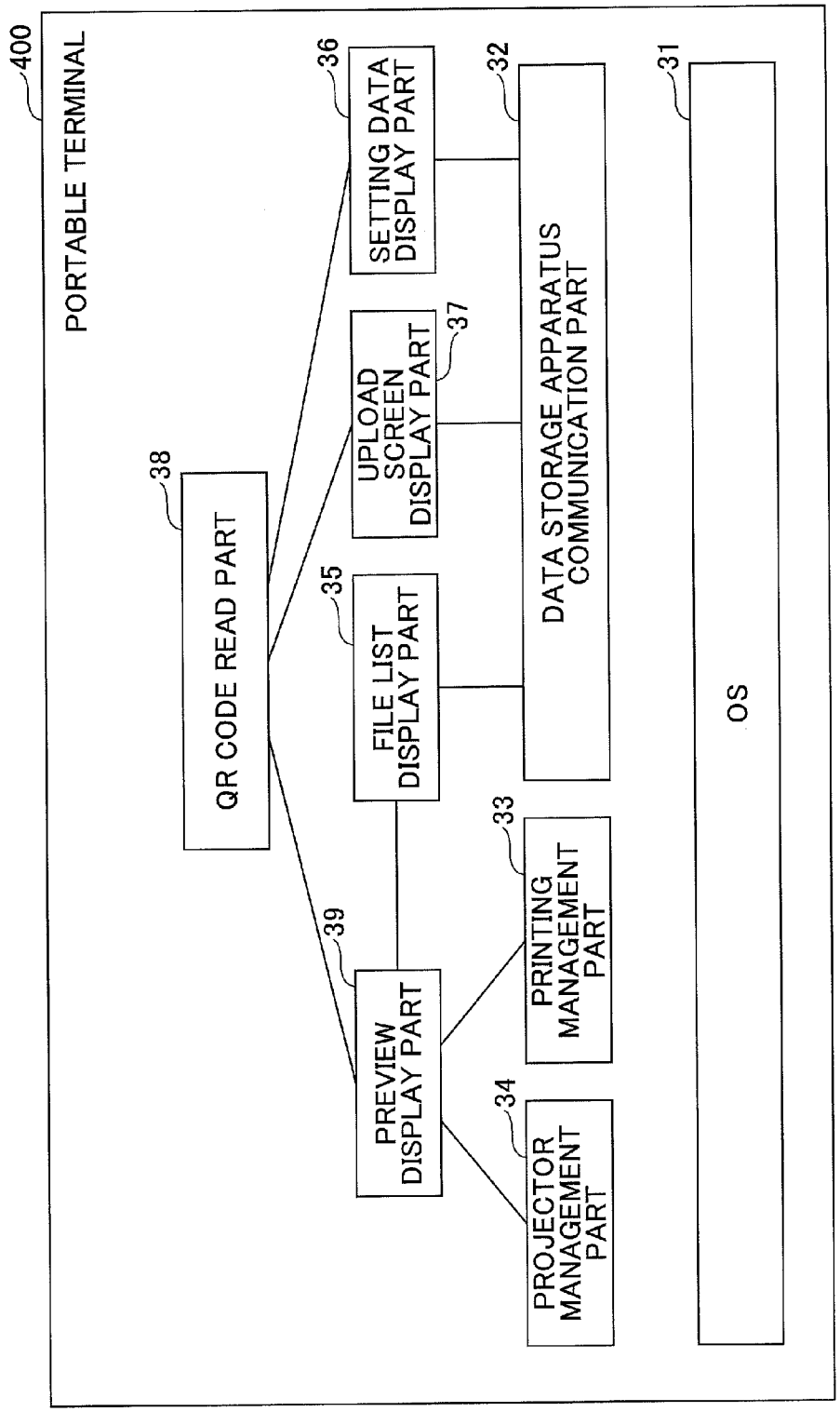
FIG. 5 is a block diagram illustrating process parts of a portable terminal according to an embodiment of the present invention.

The portable terminal 400 according to an embodiment of the present invention is implemented with, for example, the process parts illustrated in the block diagram of FIG. 5. FIG. 5 is a block diagram illustrating process parts of the portable terminal 400 according to an embodiment of the present invention. The portable terminal 400 executes a program(s) to implement the processes of an OS 31, a data storage apparatus communication part 32, a printing management part 33, a projector management part 34, a file list display part 35, a setting data display part 36, an upload screen display part 37, a QR code read part 38, and a preview display part 39 by way of a processor.

The OS 31 is an operating system of the portable terminal 400. The OS 31 controls the entire system of the portable terminal 400. The OS 31 may be, for example, iOS (registered trademark) or Android (registered trademark).

The data storage apparatus communication part 32 transmits/receives data with respect to the Web API 26 of the data storage apparatus 10 by using HTTP. Further, the data storage apparatus communication part 32 accesses the shared folder 27 of the data storage apparatus 10 by using SMB.

For example, the file list display part 35, the setting data display part 36, and the upload screen display part 37 use the data storage apparatus communication part 32 to obtain data such as electronic data from the data storage apparatus 10 or to request the data storage apparatus 10 to perform a predetermined process.

For example, the file list display part 35 displays a list of files in the data storage apparatus 10 and receives (accepts) a selection of a file by the user. For example, the setting data display part 36 performs settings for communicating with the data storage apparatus 10 and displays setting data of the portable terminal 400. For example, the upload screen display part 37 displays a menu of files for uploading to the data storage apparatus 10 and uploads data such as a file to the data storage apparatus 10.

For example, data may be uploaded to the data storage apparatus 10 by reading a QR code indicated on the MFP 13, scanning data with the MFP 13, and uploading the scanned data to the data storage apparatus 10. In another example, data may be uploaded to the data storage apparatus 10 by uploading data from the portable terminal 400. In yet another example, data may be uploaded to the data storage apparatus 10 by taking a photograph with a camera function of the portable terminal 400 and uploading data of the photograph to the data storage apparatus 10.

In a case where the user selects a file from the list of files displayed by the file list display part 35, the preview display part 39 displays a preview of the file selected by the user.

The preview display part 39 also displays a menu for performing a projecting process or a printing process. The projector management part 34 performs processes such as searching/registering the projector 14 and instructing the projector 14 to project the file selected by the user. The printing management part 33 performs processes such as searching/registering the MFP 13 and instructing the MFP 13 to print the file selected by the user.

In a case of reading a QR code with the portable terminal 400, the QR code read part 38 may use, for example, the preview display part 39, the setting data display part 36, and the screen display part 37. The QR code read by the QR code read part 38 includes, for example, a QR code to be registered for connecting the portable terminal 400 to the data storage apparatus 10, a QR code for identifying (designating) the MFP 13 that is to perform a printing process or a scanning process, or a QR code for identifying (designating) the projector 14 that is to perform a projecting process.

<Details of Processes>

Next, the processes performed by the input/output system 1 according to an embodiment of the present invention are described in further detail.

<<Scanning to Projecting Via Smartphone>>

Figure 6:
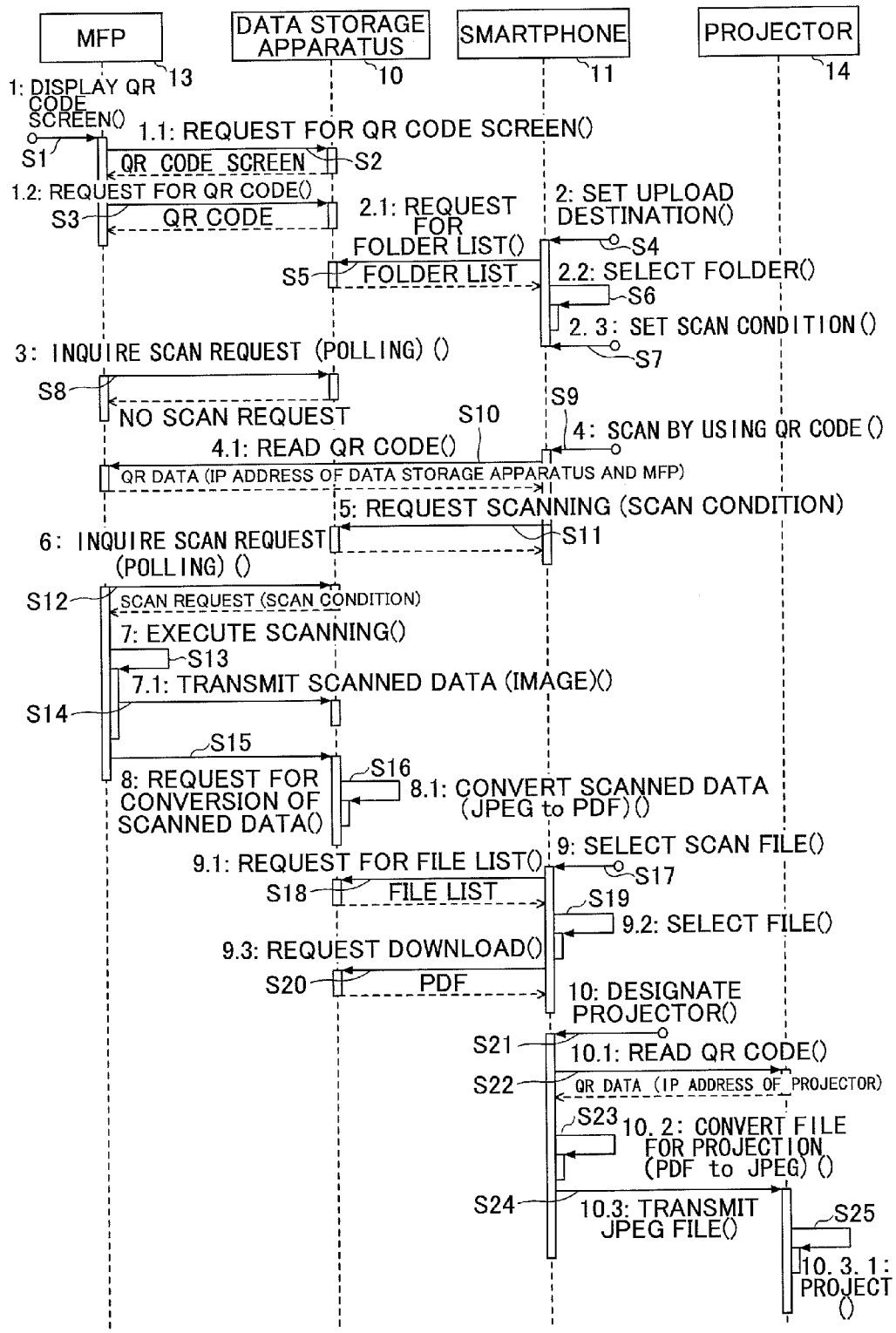
FIG. 6 is a sequence diagram illustrating processes performed by an input/output system according to an embodiment of the present invention.

In this embodiment, a sequence of processes of the input/output system 1 is performed by scanning data with the MFP 13 and projecting the scanned data with the projector 14 via the smartphone 11. FIG. 6 is a sequence diagram illustrating processes performed by the input/output system 1 according to an embodiment of the present invention.

First, the user operates the MFP 13 and requests the MFP 13 to display a QR code screen (Step S1). In a case where displaying of the QR code screen is requested by the user, the MFP 13 sends a request for a QR code screen to the data storage apparatus 10 to obtain a QR code screen (Step S2). Further, the MFP 13 sends a request for a QR code to the data storage apparatus 10 to obtain a QR code (Step S3). Thereby, the MFP 13 displays the QR code screen including the QR code.

The QR code displayed in the QR code screen includes, for example, an IP address of the data storage apparatus 10 that generated the QR code, an IP address of the MFP 13 that displays the QR code, and capability data of a target electronic device (e.g., capability data of the MFP 13). The capability data of the target electronic device indicates a process that can be performed by the target electronic device. For example, the capability data of the target electronic device indicate whether a printing process can be performed, whether a projecting process can be performed, or whether a scanning process can be performed. In a case of providing a scanning service with the target electronic device, the QR code includes data indicating that the target electronic device includes a scanning function.

Figure 7:
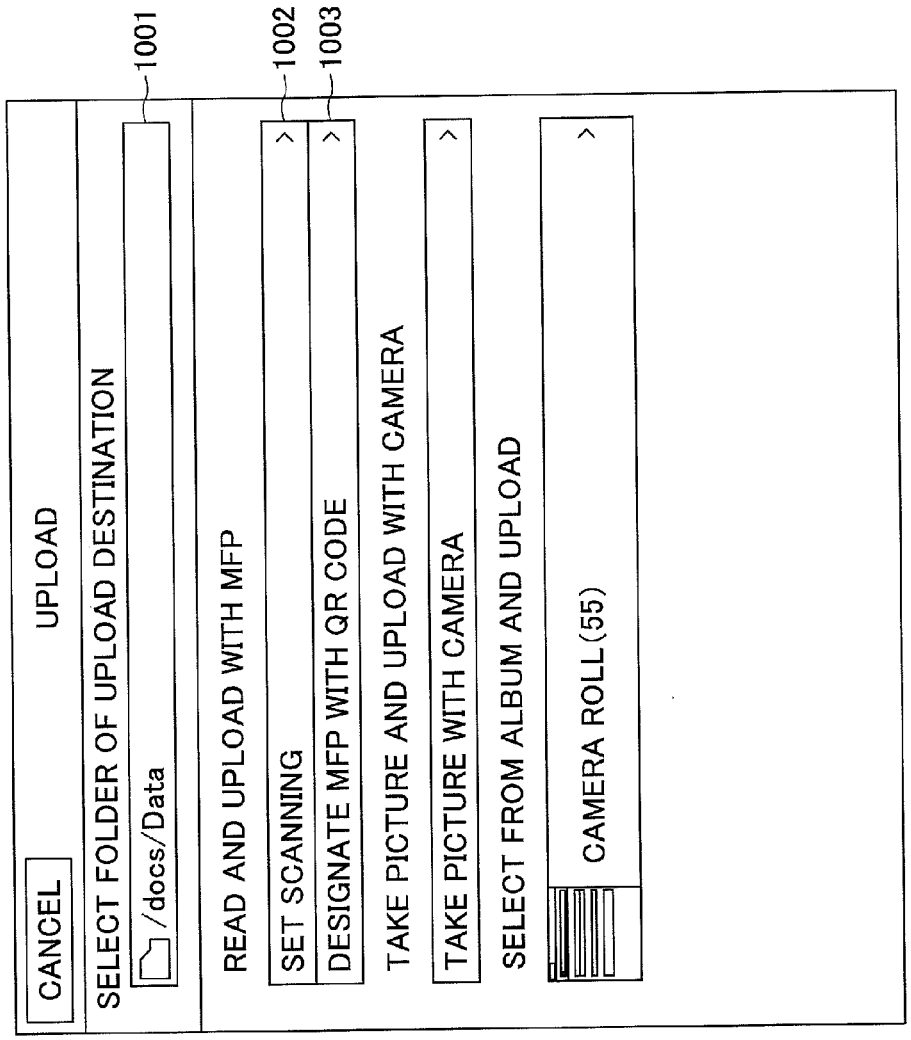
FIG. 7 is a schematic diagram illustrating an example of an upload screen.

Then, the user operates the smartphone 11 and requests the smartphone 11 to display an upload screen for setting an upload destination (Step S4). FIG. 7 is a schematic diagram illustrating an example of the upload screen. When the user presses an upload destination setting button 1001 displayed on the upload screen, the smartphone 11 sends a request for a folder list (list of folders to which data can be uploaded) to the data storage apparatus 10 to obtain a folder list (Step S5). The smartphone 11 displays a folder selection screen as illustrated in, for example, FIG. 8. FIG. 8 is a schematic diagram illustrating an example of the folder selection screen.

Then, the user operates the smartphone 11 to select a folder as an upload destination from the folders in the folder list displayed in the folder selection screen of FIG. 8 (Step S6). Then, the user presses a "set scanning (set reading)" button 1002 displayed in the upload screen of FIG. 7 (Step S7). When the "set scanning" button 1002 is pressed, the smartphone 11 displays a scan (read) setting screen as illustrated in FIG. 9.

FIG. 9 is a schematic diagram illustrating an example of the scan setting screen. The user operates the smartphone 11 to set scan conditions by way of the scan setting screen. Scan conditions that can be set are, for example, document type, resolution, document side, document set direction, blank paper removal, document set position, file format, and double-side printing last page.

While the QR code screen (including the QR code) is being displayed by the MFP 13, the MFP 13 performs polling with respect to the data storage apparatus 10 for inquiring whether a scanning process has been requested by using the QR code (Step S8). The process of inquiring whether scanning has been requested is a background process of the MFP. In a case where the scanning process has not yet been requested, a "no scan request" is returned from the data storage apparatus 10 in response to the MFP's inquiry in Step S8.

It is to be noted that the order for performing the process of displaying the QR code screen including Steps S1-S3, the process of selecting the folder of the upload destination including Step S4-S6, and the process of setting the scan conditions including Step S7 is merely an example and may be arbitrarily changed.

Then, the user operates the smartphone 11 and selects "scan by using a QR code" by pressing a "designate MFP with QR code" button 1003 displayed on the upload screen of FIG. 7 (Step S9).

Figure 10:
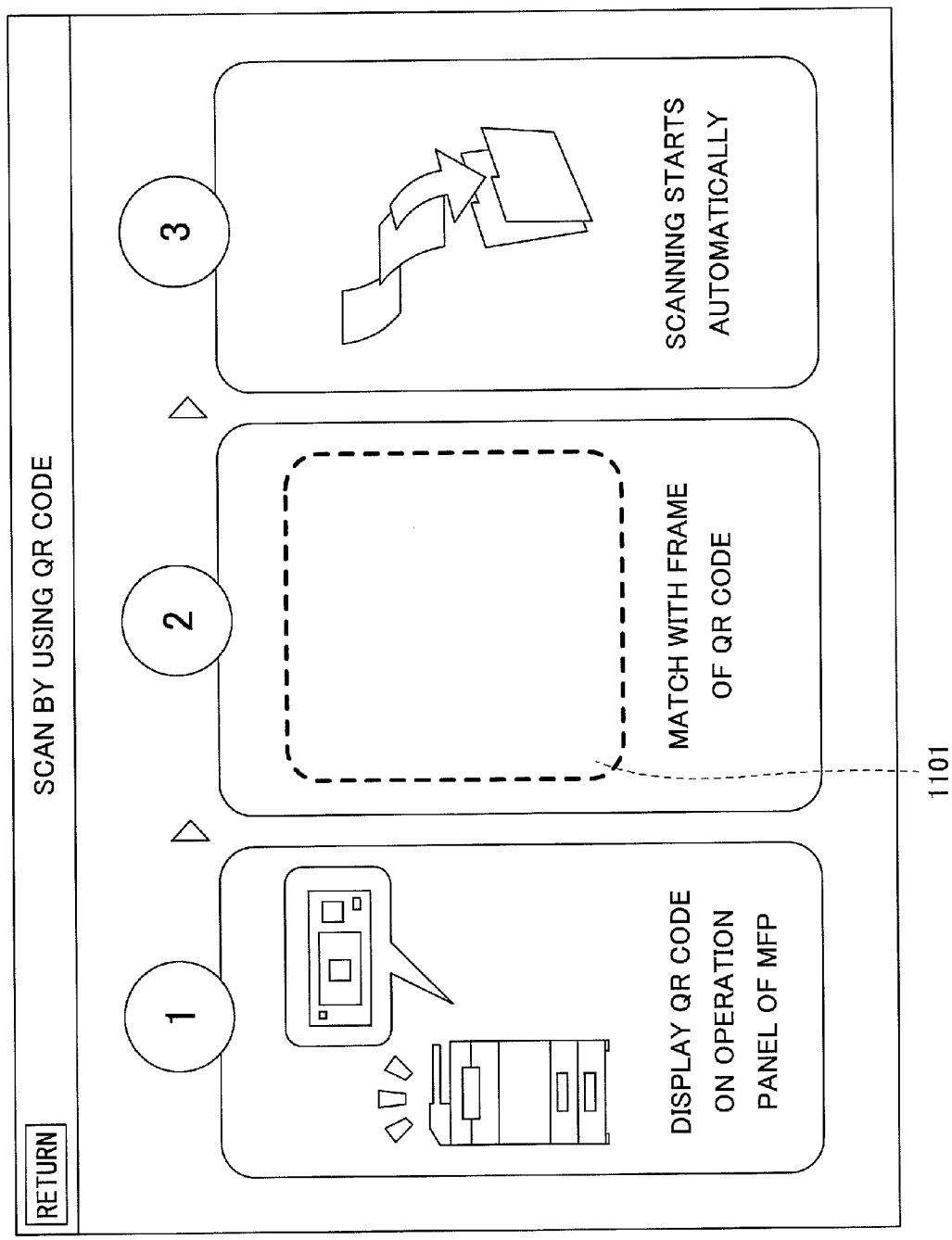
FIG. 10 is a schematic diagram illustrating an example of a QR code read screen.

When the "designate MFP with QR code" button 1003 is pressed, the smartphone 11 displays a QR code read screen as illustrated in FIG. 10. FIG. 10 is a schematic diagram illustrating an example of the QR code read screen. The QR code read screen includes a QR code display area 1101. In this embodiment, the QR code display area 1101 is an area from which an image taken (obtained) by the camera function of the smartphone 11 is displayed.

Then, the user uses the camera function of the smartphone 11 to obtain an image of the QR code displayed on the QR code screen of the MFP 13 (Step S10). The user adjusts the position between the QR code displayed on the QR code screen and the smartphone 11, so that the image of the QR code obtained with the camera function of the smartphone 11 can be displayed in the QR code display area 1101 of the QR code read screen.

By obtaining the image of the QR code, the smartphone 11 reads the QR code displayed on the QR code screen of the MFP 13. As mentioned above, the read QR code includes the IP address of the data storage apparatus 10 which is to be the destination for transmitting scanned data, the IP address of the MFP 13 which is the source for transmitting the scanned data, and capability data of the MFP 13.

The smartphone 11 determines whether the capability data of the MFP 13 obtained from the QR code includes a scanning function selected by the user in Step S9. For example, in a case where the user selects a scanning function by pressing "scan by using a QR code", the smartphone 11 determines whether the capability data of the MFP 13 obtained from the QR code includes data indicating that the MFP 13 has a scanning function.

Figure 11:
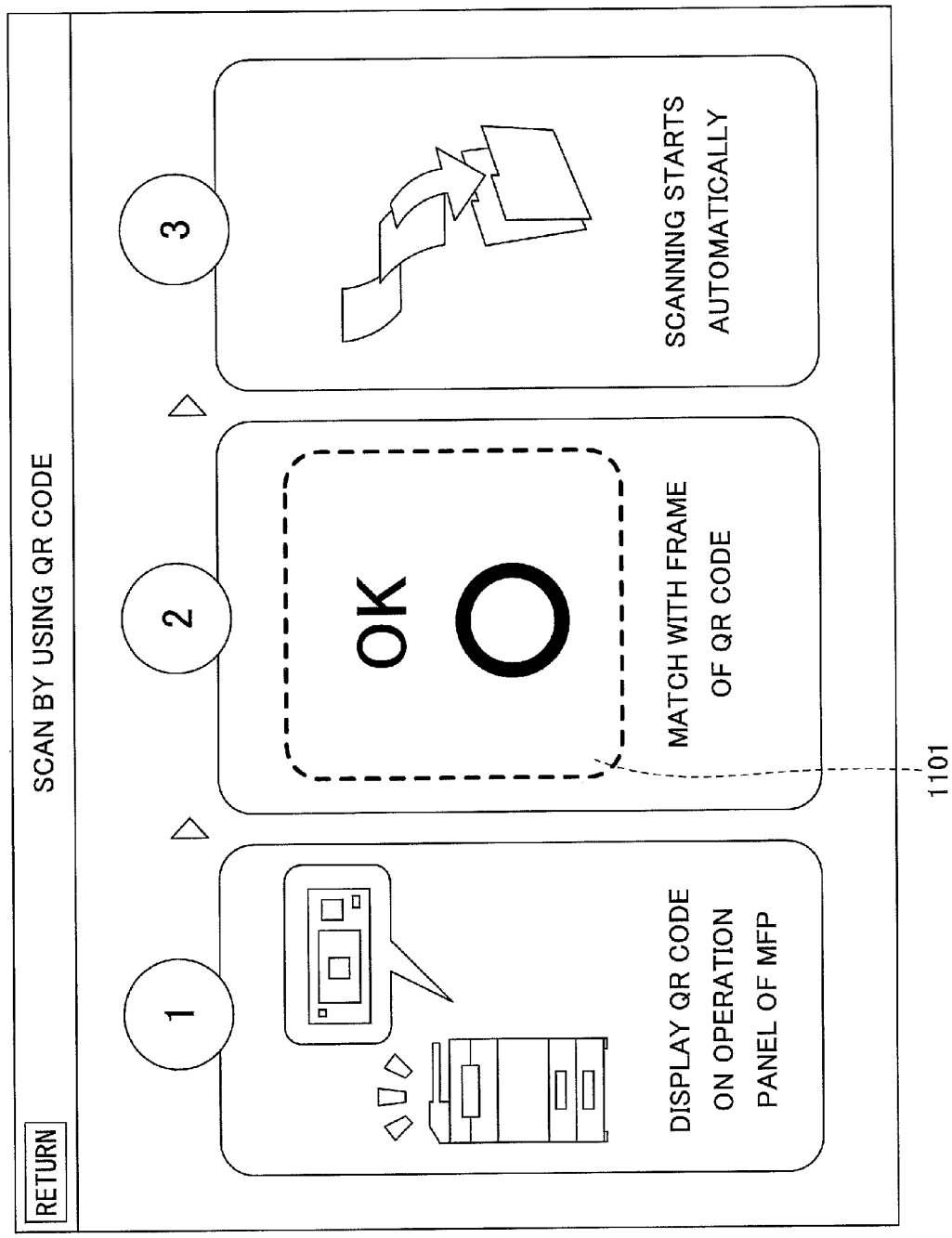
FIG. 11 is a schematic diagram illustrating an example of a QR code read screen in a case where an MFP has a scanning function.

In a case where the QR code includes data indicating that the MFP 13 includes a scanning function, the smartphone 11 proceeds to a subsequent process (in this embodiment, a process of requesting a scanning process). In this case, the smartphone 11 may display the QR code read screen as illustrated in FIG. 11 for informing the user that the target electronic device (MFP 13) has a scanning function and that the scanning process can be performed. FIG. 11 is a schematic diagram illustrating an example of the QR code read screen in a case where the MFP 13 has a scanning function.

Figure 12:
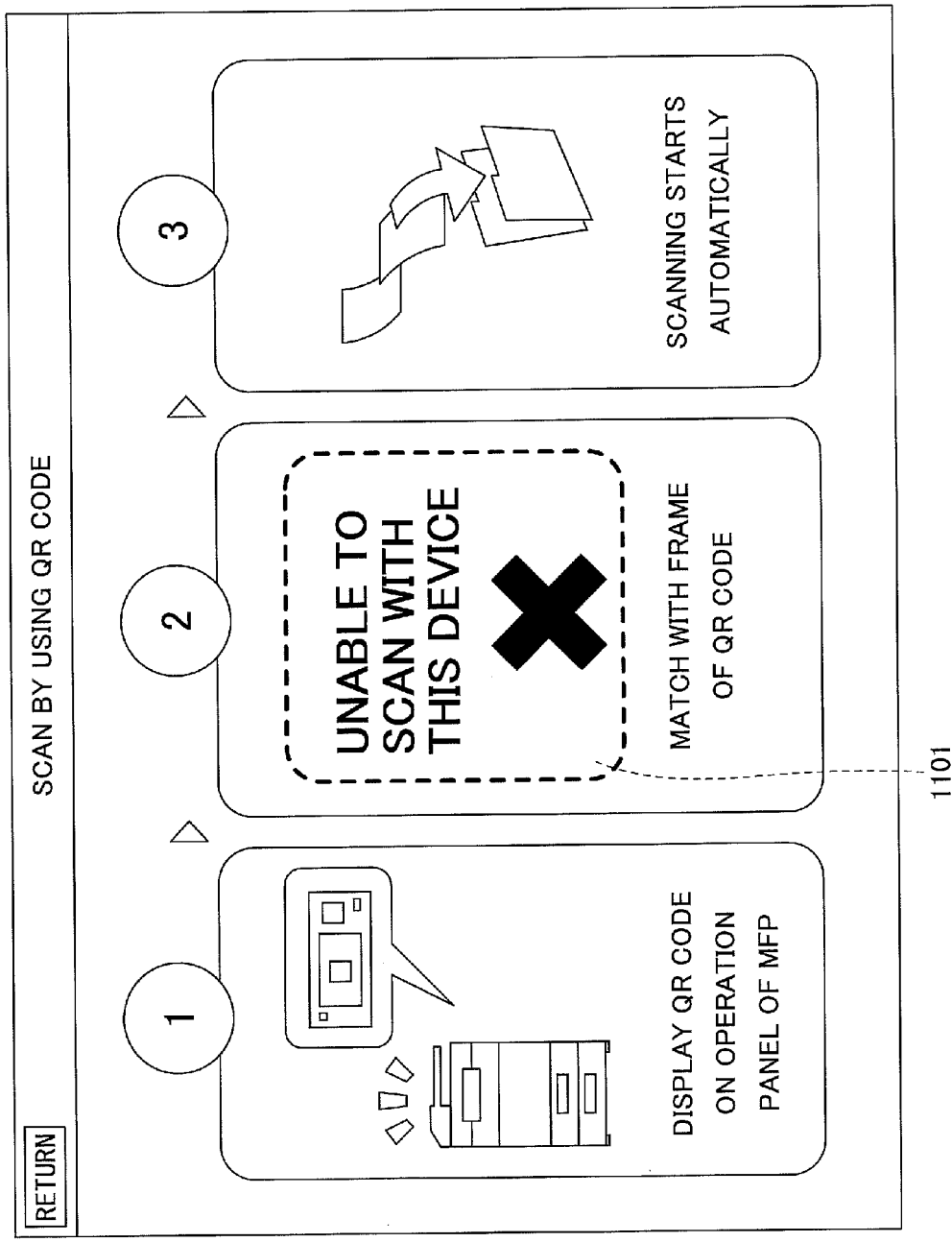
FIG. 12 is a schematic diagram illustrating an example of the QR code read screen in a case where an MFP does not have a scanning function.

In a case where the QR code does not include data indicating that the MFP 13 includes a scanning function, the smartphone 11 indicates an error on the QR code read screen as illustrated in FIG. 12 and terminates displaying the QR code read screen. FIG. 12 is a schematic diagram illustrating an example of the QR code read screen in a case where the MFP 13 does not have a scanning function. Alternatively, after displaying the QR code read screen as illustrated in FIG. 12, the smartphone 11 may display the QR code read screen of FIG. 10 again and continue displaying the QR code read screen until the smartphone 11 determines that a QR code includes data indicating that the MFP 13 includes a scanning function.

Then, the smartphone 11 uses the IP address of the data storage apparatus 10 which is to be the destination for transmitting scanned data and transmits a scan request to the data storage apparatus 11 (Step S11). The scan request includes data pertaining to the folder to which data is uploaded and data pertaining to the scan conditions.

Similar to Step S8, the MFP 13 performs polling with respect to the data storage apparatus 10 for inquiring whether a scanning process has been requested by using the QR code (Step S12). In this case, a response indicating a scan request is returned from the data storage apparatus 10 in response to the MFP's inquiry. In addition to the response from the data storage apparatus, the data pertaining to the folder to which data is uploaded and the data pertaining to the scan conditions are also transmitted to the MFP 13. Then, the MFP 13 executes a scanning process in accordance with the scan conditions (Step S13). Then, the MFP 13 stores the scanned data in the folder of the data storage apparatus 10 selected as the upload destination (Step S14).

The processes performed in Steps S13 and S14 are repeated in correspondence with the number of pages of the scanned document. The scanned data becomes JPEG format data or TIFF format data depending on whether the scanned data is color or monochrome. After every page of the document has been scanned, the MFP 13 requests the data storage apparatus 10 to perform data conversion on the scanned data (Step S15).

The data storage apparatus 10 gathers (combines) all of the scanned data corresponding to each page into a single group of data and converts the scanned data into a scan file of a PDF format (Step S16). It is, however, to be noted that the scanned data may be converted into data formats other than the PDF format. The data format used to convert the scanned data in FIG. 16 may be, for example, a data format capable of combining all of the scanned data into a single group of data or a data format capable of being displayed with the smartphone 11.

Figure 13:
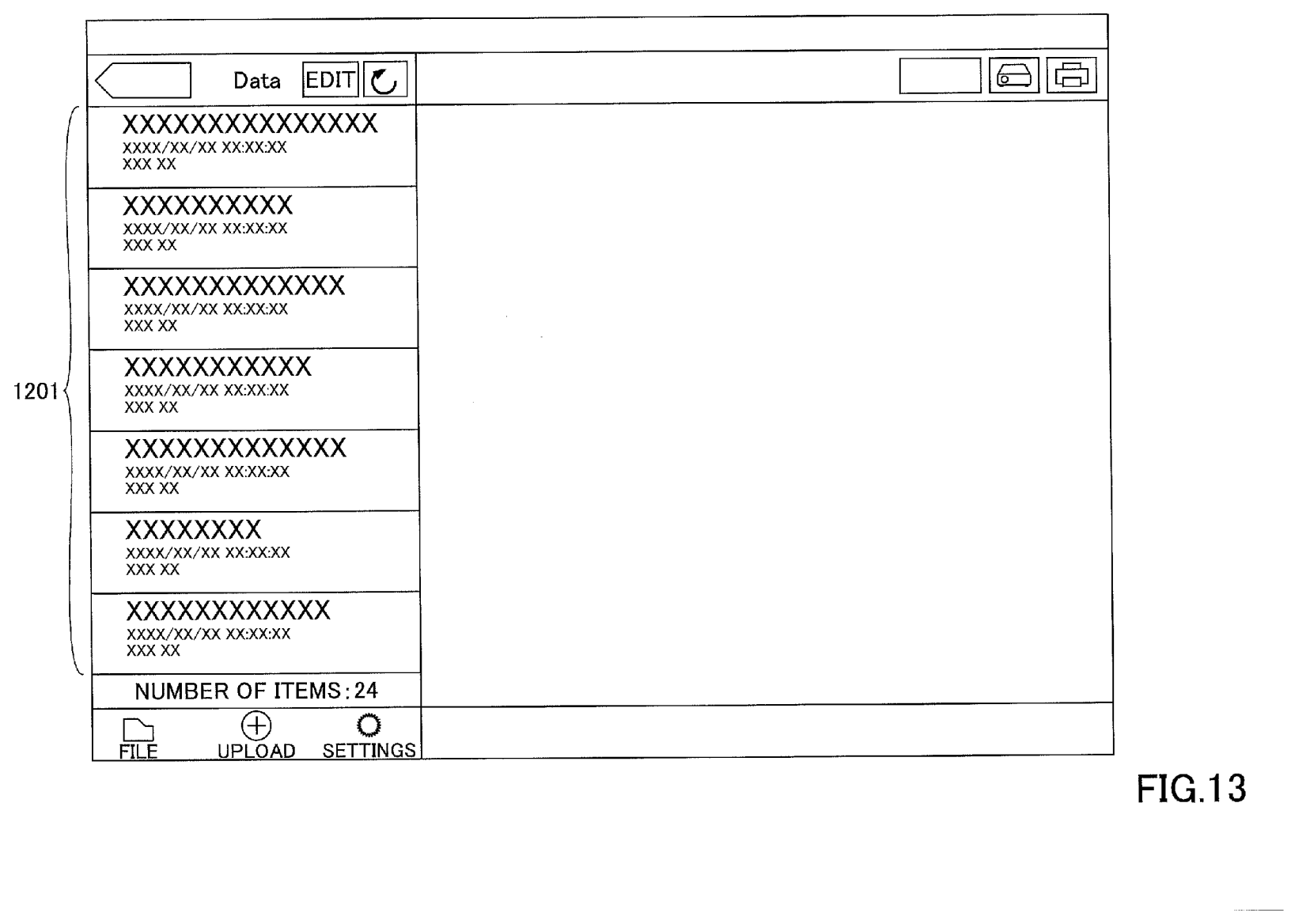

Then, the user operates the smartphone 11 and requests the smartphone 11 to display a main screen (see FIG. 13) for selecting a scan file (Step S17). FIG. 13 is a schematic diagram illustrating an example of the main screen.

In a case where the user has requested the smartphone 11 to display the main screen, the smartphone 11 obtains a file list by requesting the data storage apparatus 10 for the file list (Step S18). Then, the smartphone 11 displays the main screen including a file list 1201 as illustrated in FIG. 13 (Step S19).

In Step S19, the user operates the smartphone 11 and selects a file (in this embodiment, scan file) from the file list 1201 of FIG. 13. Then, the smartphone 11 obtains the scan file by requesting downloading of the file (scan file) selected by the user (Step S20).

Figure 14:
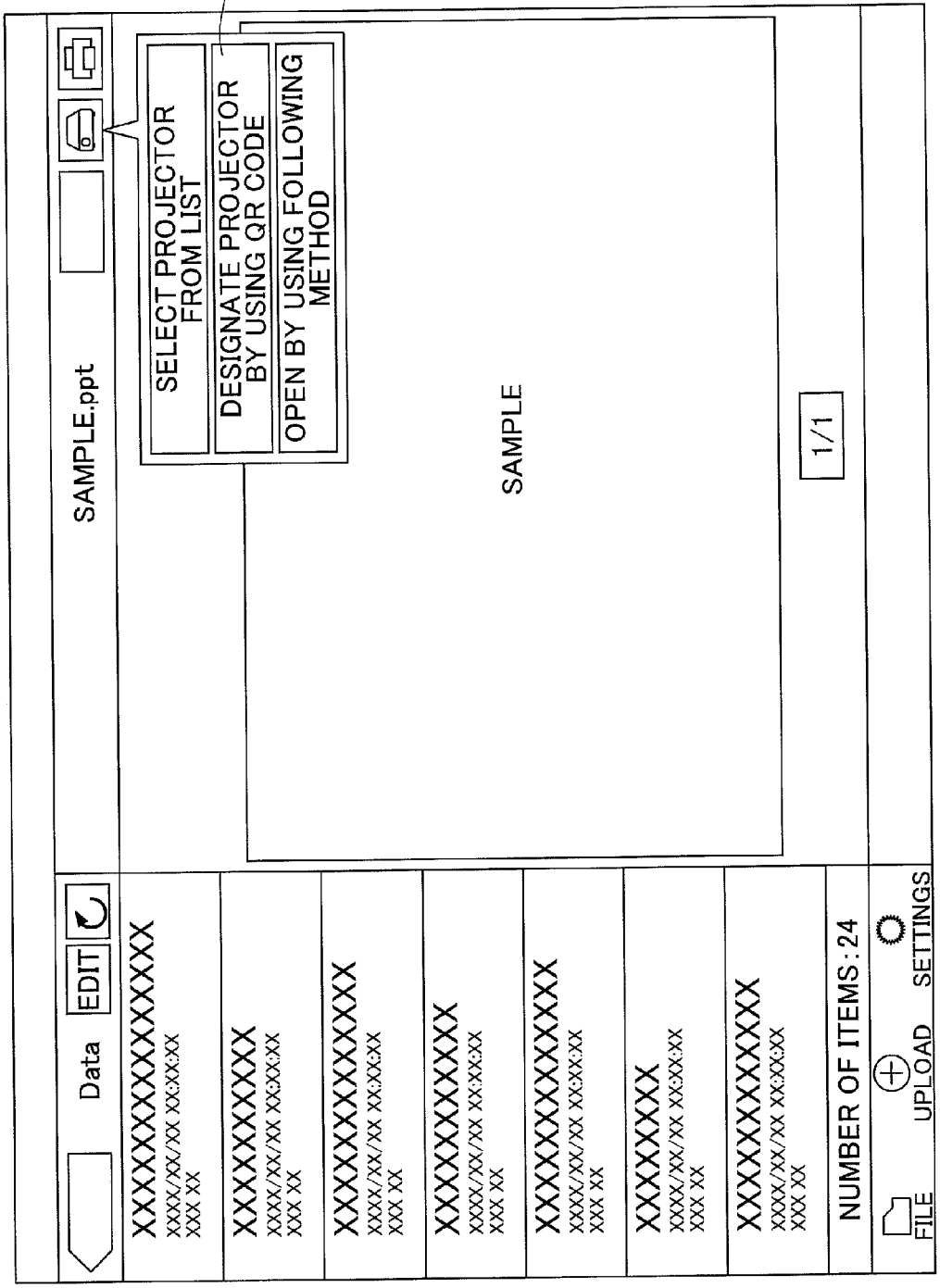
FIG. 14 is a schematic diagram illustrating an example of a preview displayed on a main screen.

As illustrated in FIG. 14, the smartphone 11 displays a preview of the scan file downloaded from the data storage apparatus 10 on the main screen. FIG. 14 is a schematic diagram illustrating an example of the preview displayed on the main screen.

Then, the user operates the smartphone 11 and selects "project by using QR code" (data output by projecting) by pressing a "designate projector with QR code" button 1211 displayed on the main screen of FIG. 14 (Step S21). When the "designate projector with QR code" button 1211 is pressed, the smartphone 11 displays a QR code read screen as illustrated in FIG. 15.

Figure 15:
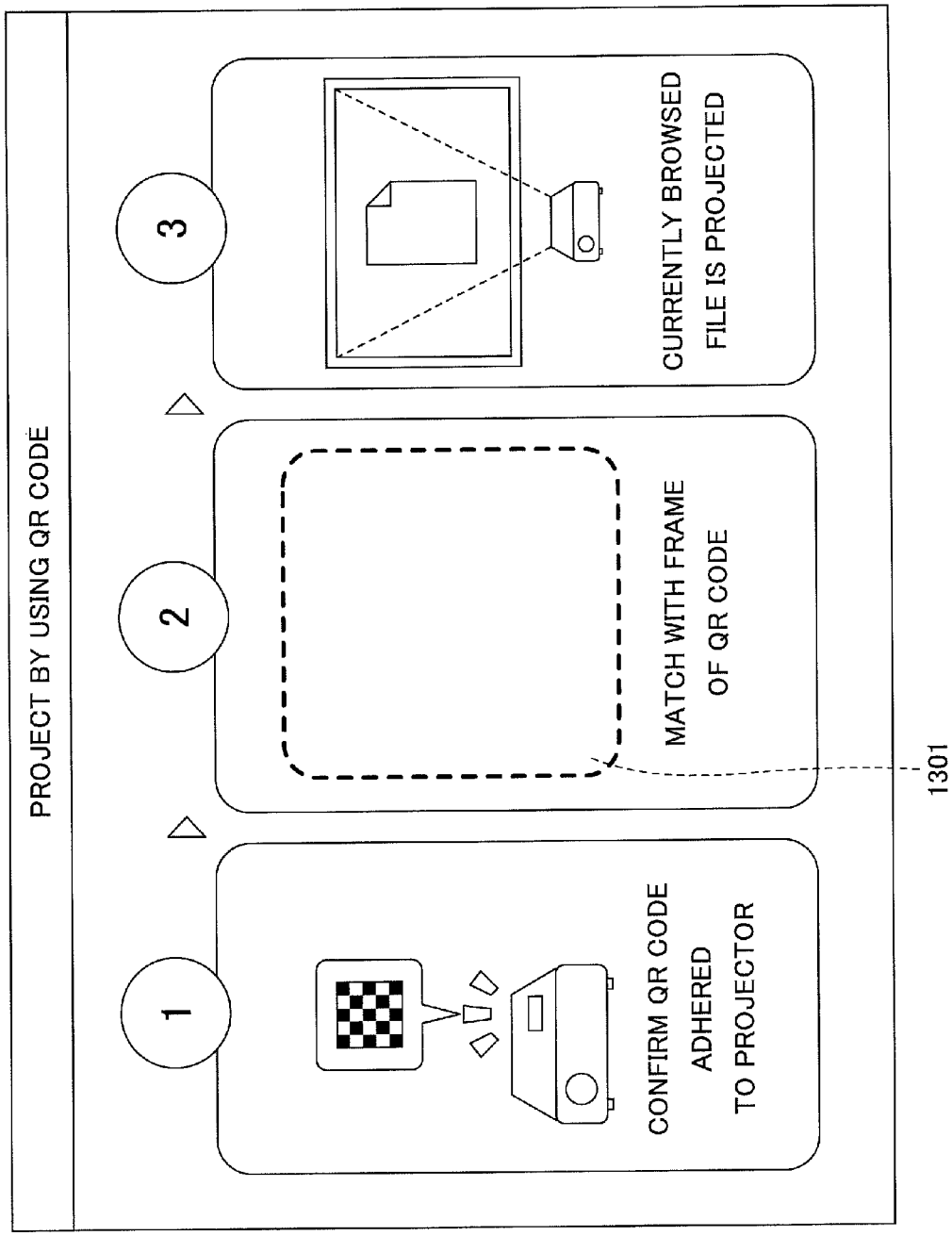
FIG. 15 is a schematic diagram illustrating another example of a QR code read screen.

FIG. 15 is a schematic diagram illustrating an example of the QR code read screen. The QR code read screen includes a QR code display area 1301. In this embodiment, the QR code display area 1301 is an area from which an image taken (obtained) by the camera function of the smartphone 11 is displayed.

Then, the user uses the camera function of the smartphone 11 to obtain an image of a QR code of the projector 14 (Step S22). For example, the QR code of the projector 14 may be indicated on an adhesive material adhered to a casing of the projector 14. Alternatively, the QR code of the projector 14 may be indicated on a projection screen. Alternatively, in a case where there is a display panel, the QR code of the projector 14 may be indicated on the display panel.

The user adjusts the position between the QR code of the projector 14 and the smartphone 11, so that the image of the QR code obtained with the camera function of the smartphone 11 can be displayed in the QR code display area 1301 of the QR code read screen.

By obtaining the image of the QR code, the smartphone 11 reads the QR code of the projector 14. As mentioned above, the read QR code includes the IP address of the projector 14 which is to project the scan file and capability data of the projector 14.

The smartphone 11 determines whether the capability data of the projector 14 obtained from the QR code includes a projecting function. That is, the smartphone 11 determines whether the capability data of the projector 14 obtained from the QR code includes data indicating that the projector 14 has a projecting function.

In a case where the QR code includes data indicating that the projector 14 includes a projecting function, the smartphone 11 proceeds to a subsequent process (in this embodiment, a process of requesting a projecting process). On the other hand, in a case where the QR code does not include data indicating that the projector 14 includes a projecting function, the smartphone 11 indicates an error on the QR code read screen and terminates displaying the QR code read screen. Alternatively, after displaying the error on the QR code read screen, the smartphone 11 may display the QR code read screen of FIG. 15 again and continue displaying the QR code read screen until the smartphone 11 determines that a QR code includes data indicating that the projector 14 includes a projecting function. Similar to the scanning service, in the case where the QR code includes data indicating that the projector 14 includes a projecting function, the smartphone 11 may display the QR code read screen as illustrated in FIG. 11 for informing the user that the target electronic device (projector 14) has a projecting function and that the scanning process can be performed.

Further, in the case where the QR code does not include data indicating that the projector 14 includes a projecting function, the smartphone 11 indicates an error on the QR code read screen similar to that of FIG. 12.

Then, the smartphone 11 converts the scan file of the PDF format obtained in Step S20 into a file for projection (Step S23). In this embodiment, the data format of the scan file converted in Step S23 is a JPEG format. It is, however, to be noted that the scan file may be converted into data formats other than the JPEG format. The data format that is converted in Step S23 may be, for example, a data format that can be projected by the projector 14.

Then, the smartphone 11 transmits the file for projection (hereinafter also referred to as "projection file") to the projector 14 (Step S24). Then, the projector 14 executes a process of projecting the projection file received from the smartphone 11 (Step S25).

Accordingly, by performing the processes illustrated in the sequence diagram of FIG. 6, the MFP 13 for scanning data and the projector 14 for projecting data can easily cooperate with each other. Although the user explicitly selects data input by scanning in Step S9 of the sequence diagram of FIG. 6, whether to perform data input by scanning may be determined according to function data included in the QR code of the MFP 13.

Further, although the user explicitly selects "data output by projecting" in Step S21 of the sequence diagram of FIG. 6, whether to perform data output by projecting may be determined according to function data included in the QR code of the projector 14.

Further, after Step S10 of the sequence diagram of FIG. 6, an error may be determined depending on whether a function explicitly selected by the user is included in the functions of the function data included in the QR code of the MFP 13. For example, the smartphone 11 may determine that the function explicitly selected by the user in Step S9 is an error when the function explicitly selected by the user is not included in the functions of the function data included in the QR code of the MFP 13.

Further, after Step S22 of the sequence diagram of FIG. 6, an error may be determined depending on whether a function explicitly selected by the user is included in the functions of the function data included in the QR code of the projector 14. For example, the smartphone 11 may determine that the function explicitly selected by the user in Step S21 is an error when the function explicitly selected by the user is not included in the functions of the function data included in the QR code of the projector 14.

<<Scanning to Printing Via Smartphone>>

Figure 16:
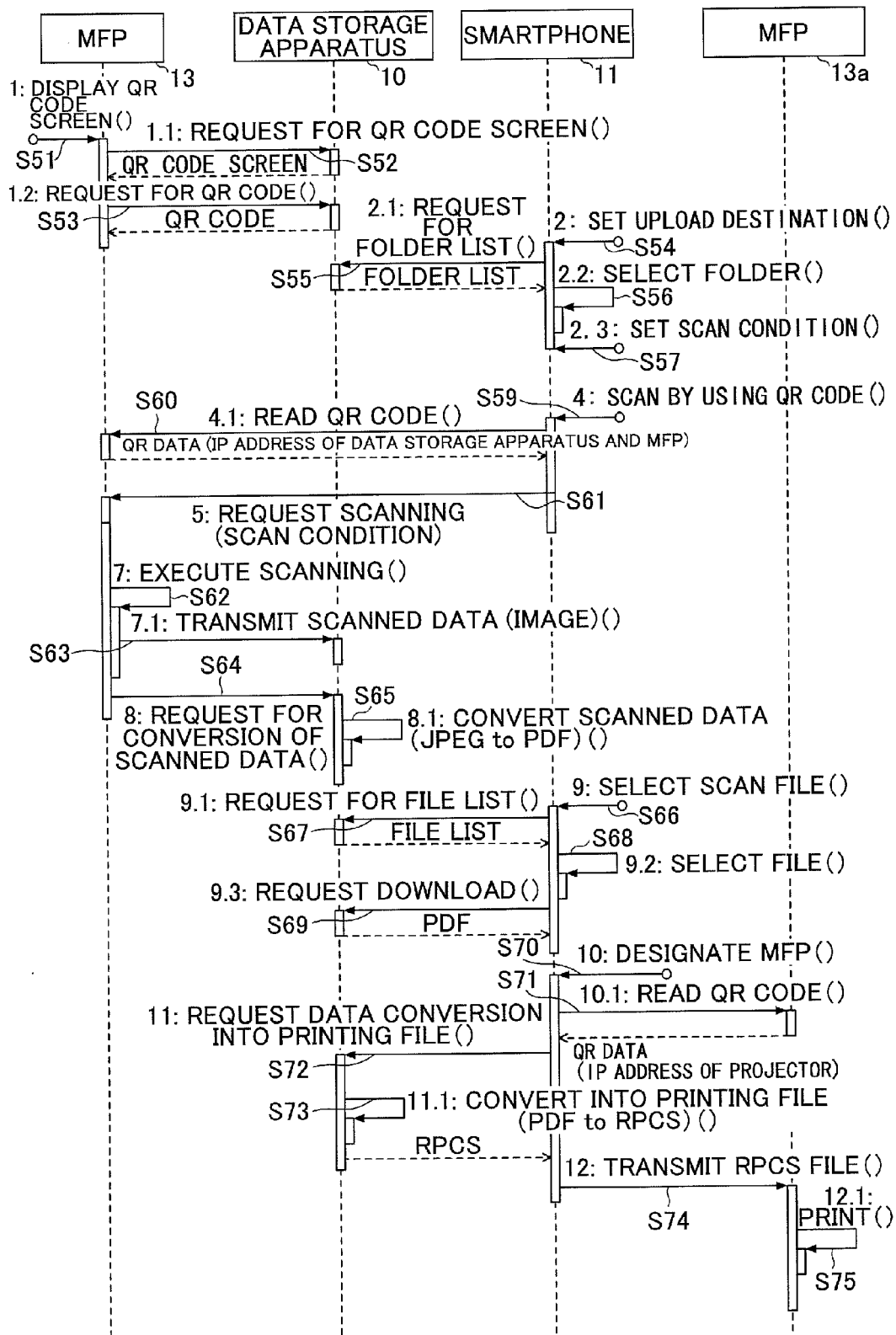
FIG. 16 is a sequence diagram illustrating processes performed by an input/output system according to another embodiment of the present invention.

In this embodiment, a sequence of processes of the input/output system 1 is performed by scanning data with the MFP 13 and printing the scanned data with an MFP 13a via the smartphone 11. FIG. 16 is a sequence diagram illustrating processes performed by the input/output system 1 according to another embodiment of the present invention. It is to be noted that the sequence diagram of FIG. 16 is substantially the same as the sequence diagram of FIG. 6 except for a portion of the sequence diagram of FIG. 16. Therefore, explanation of like processes between the sequence diagram of FIG. 6 and the sequence diagram of FIG. 16 is omitted.

The processes of Steps S51-S57 of FIG. 16 are substantially the same as the processes of Steps S1-S7 of FIG. 6. Therefore, further explanation of the processes of Steps S51-S57 of FIG. 16 is omitted. Then, the user operates the smartphone 11 and selects "scan by using a QR code" by pressing a "designate MFP with QR code" button 1003 displayed on the upload screen of FIG. 7 (Step S59).

When the "designate MFP with QR code" button 1003 is pressed, the smartphone 11 displays a QR code read screen as illustrated in FIG. 10. Then, the user uses the camera function of the smartphone 11 to obtain an image of the QR code displayed on the QR code screen of the MFP 13 (Step S60). By obtaining the image of the QR code, the smartphone 11 reads the QR code displayed on the QR code screen of the MFP 13.

Then, the smartphone 11 uses the IP address of the MFP 13 which is to be the source for transmitting scanned data and transmits a scan request to the MFP 13 (Step S61). The scan request includes data pertaining to the folder to which data is uploaded and data pertaining to the scan conditions. In the sequence diagram of FIG. 15, the MFP 13 does not performs polling with respect to the data storage apparatus 10 for inquiring whether a scanning process has been requested by using the QR code. Instead of transmitting a scan request to the data storage apparatus 10, the smartphone 11 transmits a scan request to the MFP 13.

Figure 17:
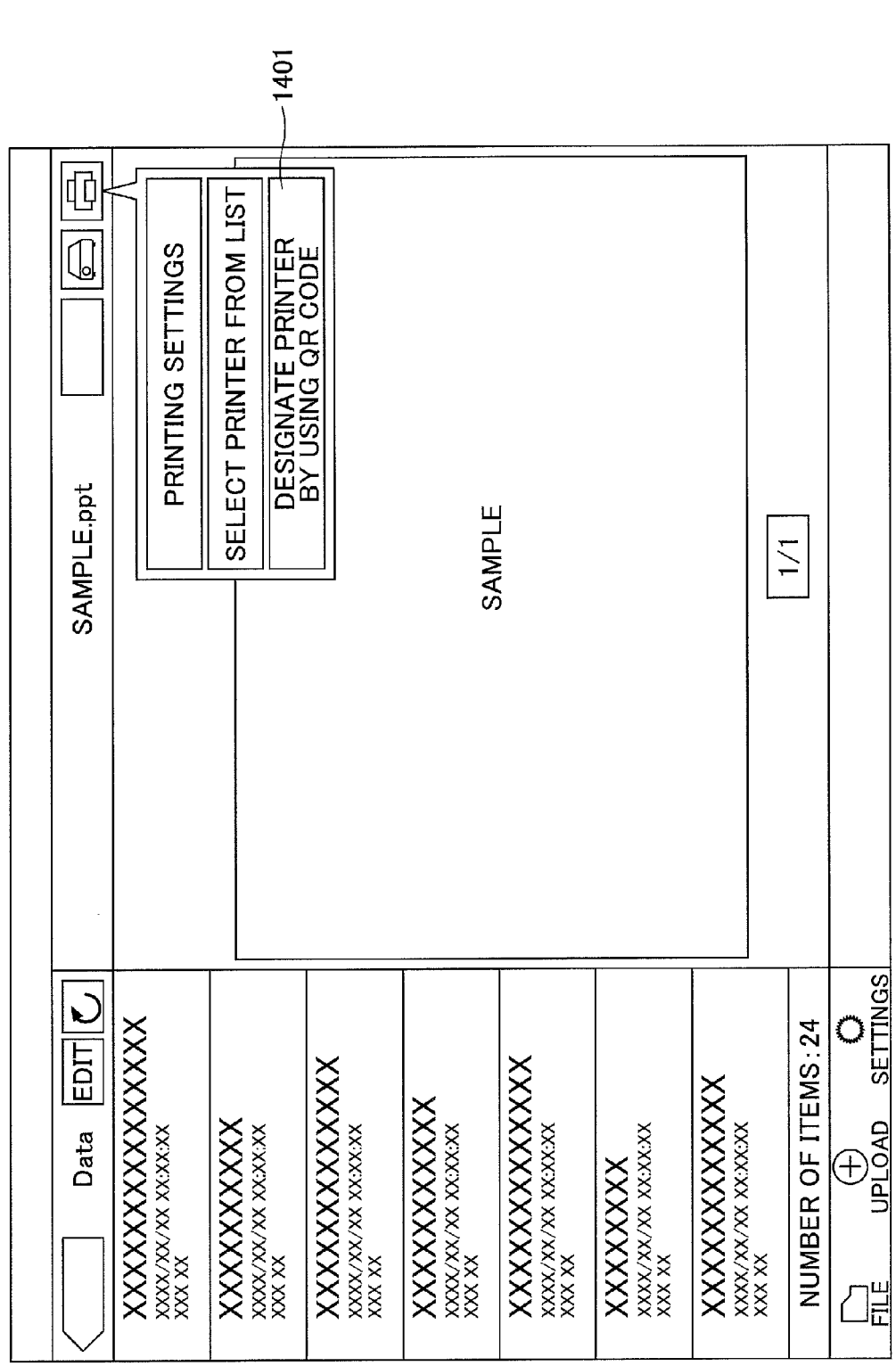
FIG. 17 is a schematic diagram illustrating another example of a main screen.

The processes of Steps S62-S69 of FIG. 16 are substantially the same as the processes of Steps S13-S20 of FIG. 6. Therefore, further explanation of the processes of Steps S62-S69 of FIG. 16 is omitted. Then, the user operates the smartphone 11 and selects "MFP printing by using QR code" by pressing a "designate MFP with QR code" button 1401 displayed on the main screen of FIG. 17 (Step S70). When the "designate MFP with QR code" button 1401 is pressed, the smartphone 11 displays a QR code read screen as illustrated in FIG. 18.

Figure 18:
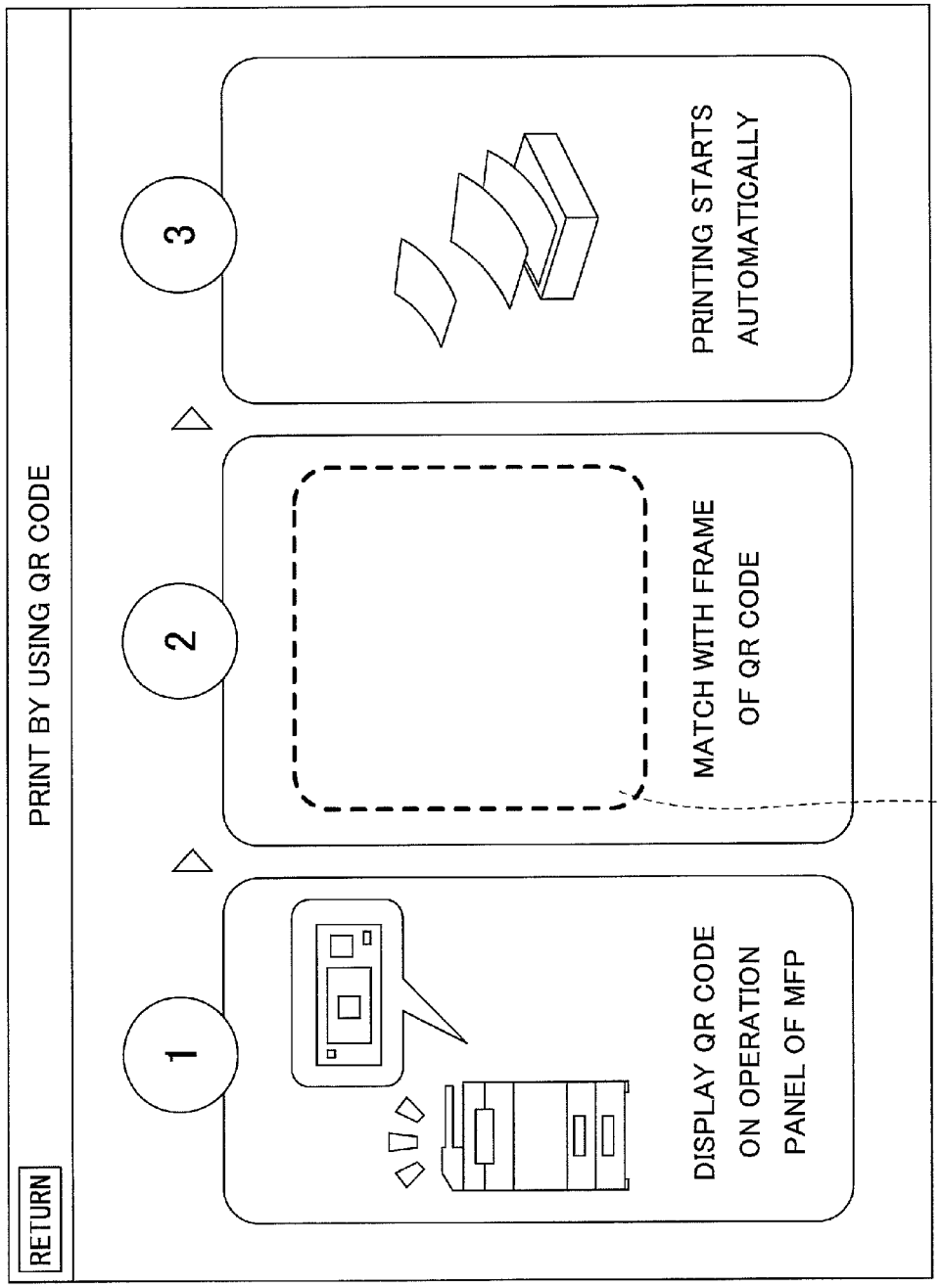
FIG. 18 is a schematic diagram illustrating another example of a QR code read screen.

FIG. 18 is a schematic diagram illustrating an example of the QR code read screen. The QR code read screen includes a QR code display area 1501. In this embodiment, the QR code display area 1501 is an area from which an image taken (obtained) by the camera function of the smartphone 11 is displayed.

Then, the user uses the camera function of the smartphone 11 to obtain an image of a QR code of the MFP 13a (Step S71). For example, the QR code of the MFP 13a may be indicated on an adhesive material adhered to a casing of the MFP 13a. Alternatively, the QR code of the MFP 13a may be indicated on an operation panel of MFP 13a. The user adjusts the position between the QR code of the MFP 13a and the smartphone 11, so that the image of the QR code obtained with the camera function of the smartphone 11 can be displayed in the QR code display area 1501 of the QR code read screen. By obtaining the image of the QR code, the smartphone 11 reads the QR code of the MFP 13a which includes an IP address of the MFP 13a.

Then, the smartphone 11 request the data storage apparatus 10 to perform data conversion on the scan file (in this embodiment, scan file of PDF format) selected in Step S68 (Step S72). Then, the data storage apparatus 10 converts the scan file into a file of a format used for printing (hereinafter also referred to as "printing file") (Step S73). In this embodiment, the format of the printing file is an RPCS format. It is, however, to be noted that the scan file may be converted into data formats other than the RPCS format. The data format used to convert the scan file may be, for example, a data format that allows the MFP 13a to print the scan file.

The data storage apparatus 10 transmits the converted data (printing file) to the smartphone 11. Then, the smartphone 11 transmits the printing file to the MFP 13a (Step S74). Then, the MFP 13a prints the printing file (Step S75).

Accordingly, by performing the processes illustrated in the sequence diagram of FIG. 16, the MFP 13 for scanning data and the MFP 13a for printing data can easily cooperate with each other. Although different MFPs are used for performing the scanning process and the printing process (i.e. MFP 13 and MFP 13a), the same MFP may be used for performing the scanning process and the printing process.

Although the user explicitly selects data output by printing in Step S70 of the sequence diagram of FIG. 16, whether to perform data output by printing may be determined according to function data included in the QR code of the MFP 13a.

Further, after Step S71 of the sequence diagram of FIG. 16, an error may be determined depending on whether a function explicitly selected by the user is included in the functions of the function data included in the QR code of the MFP 13a.

Further, similar to the sequence diagram of FIG. 6, the smartphone 11 may transmits a scan request to the data storage apparatus 10, and the MFP 13 may perform polling with respect to the data storage apparatus 10 for inquiring whether a scanning process has been requested.

<<Scanning to Projecting not Via Smartphone>>

In this embodiment, a sequence of processes of the input/output system 1 is performed by scanning data with the MFP 13 and projecting the scanned data with the projector 14 without the intervening of the smartphone 11. FIG. 19 is a sequence diagram illustrating processes performed by the input/output system 1 according to yet another embodiment of the present invention. The sequence diagram of FIG. 19 is substantially the same as the sequence diagram of FIG. 6 except for a portion of the sequence diagram of FIG. 19. Therefore, explanation of like processes between the sequence diagram of FIG. 6 and the sequence diagram of FIG. 19 is omitted.

The processes of Steps S101-S122 of FIG. 19 are substantially the same as the processes of Steps S1-S22 of FIG. 6. Therefore, further explanation of the processes of Steps S101-S122 of FIG. 19 is omitted. Then, the smartphone 11 sends a request for projection of the scan file selected in Step S119 to the data storage apparatus 10 (Step S123). Then, the data storage apparatus 10 converts the scan file of the PDF format into a file for projection (Step S124). In this embodiment, the data format of the converted scan file in Step S124 is a JPEG format. It is, however, to be noted that the scan file may be converted into data formats other than the JPEG format. The data format that is converted in Step S124 may be, for example, a data format that can be projected by the projector 14.

Then, the data storage apparatus 10 transmits the file for projection (hereinafter also referred to as "projection file") to the projector 14 (Step S125). Then, the projector 14 executes a process of projecting the projection file received from the data storage apparatus (Step S126).

Accordingly, by performing the processes illustrated in the sequence diagram of FIG. 19, the MFP 13 for scanning data and the projector 14 for projecting data can easily cooperate with each other. Similar to the sequence diagram of FIG. 16, the MFP 13 need not perform polling with respect to the data storage apparatus 10 for inquiring whether a scanning process has been requested. Instead of transmitting a scan request to the data storage apparatus 10, the smartphone 11 may transmit a scan request to the MFP 13.

<<Other Processes of Input/Output System>>

According to an embodiment of the present invention, the processes of the sequence diagrams of FIG. 6, FIG. 16, and FIG. 19 may be combined, so that the input/output system 1 may arbitrarily perform the combined processes. For example, although the smartphone 11 performs the process of converting the scan file of the PDF format into the projection file of the JPEG format in the sequence diagram of FIG. 6, the data storage apparatus 10 may perform the process of converting the scan file of the PDF format into the projection file of the JPEG format as illustrated in the sequence diagram of FIG. 19.

Similarly, although the data storage apparatus 10 performs the process of converting the scan file of the PDF format into the printing file of the RPCS format in the sequence diagram of FIG. 16, the smartphone 11 may perform the process of converting the scan file of the PDF format into the printing file of the RPCS format as illustrated in the sequence diagram of FIG. 6.

Further, although the printing data is printed by the MFP 13a via the smartphone 11 in the sequence diagram of FIG. 16, the data storage apparatus 10 may directly transmit the printing data to the MFP 13a instead of transmitting the printing data by way of the smartphone 11.

CONCLUSION

With the above-described embodiments of the input/output system 1, the user can obtain data that identifies a target electronic device (e.g., QR code) by holding a portable terminal (e.g., smartphone 11, tablet terminal 12) over or near an electronic device (e.g., MFP 13, projector 14). The user can easily select an electronic device for inputting or outputting electronic data from multiple electronic devices.

Thus, with the above-described embodiments of the input/output system 1, one or more electronic devices can be controlled by having a portable terminal and a data processing apparatus (e.g., data storage apparatus 10) cooperatively operated by the user. Thereby, various services can be provided by the input/output system 1.

The present invention is not limited to the specifically disclosed embodiments, and variations and modifications may be made without departing from the scope of the present invention.

What is claimed is:

1. A service providing system comprising:
a portable terminal including a first processor and a first memory that stores a first program; and
a data processing apparatus including a second processor and a second memory that stores a second program;
wherein the first processor executes the first program to
receive selection of a scanning process or an electronic data outputting process,
display a screen including an area from which an image is taken with a camera function of the portable terminal after the selection is received,
obtain first device data from the image taken with the camera function when the screen is being displayed, the first device data identifying a first electronic device among multiple electronic devices connected to the service providing system, the first device data including capability data of the first electronic device,
determine whether the first electronic device is able to execute a selected one of the scanning process and the electronic data outputting process based on the capability data of the first electronic device included in the first device data obtained from the image taken with the camera function, and
transmit a first execution request to the data processing apparatus for requesting the first electronic device to execute the scanning process in a case where the capability data indicates that the first electronic device is able to execute the scanning process, wherein the first electronic device determined as being able to execute the scanning process is external to the portable terminal; and
wherein the second processor executes the second program to
request the first electronic device to execute the scanning process in response to the first execution request transmitted from the portable terminal, and
store the scanned data transmitted from the first electronic device into the second memory.

2. The service providing system as claimed in claim 1, wherein the first processor is configured to
transmit a second execution request to the data processing apparatus for requesting a second electronic device among multiple electronic devices connected to the service providing system to execute the electronic data outputting process in a case where the capability data of the second electronic device indicates that the second electronic device is able to execute the electronic data outputting process, and
wherein the second processor is configured to execute the second program to request the second electronic device to execute the electronic data outputting process in response to the second execution request transmitted from the portable terminal.

3. The service providing system as claimed in claim 1, wherein the first processor is configured to
transmit a second execution request to a second electronic device among multiple electronic devices connected to the service providing system for requesting the second electronic device to execute the electronic data outputting process in a case where the second electronic device is determined to be able to execute the electronic data outputting process.

4. The service providing system as claimed in claim 3, wherein the first processor is configured to obtain the electronic data from the data processing apparatus in a case where the second electronic device is determined to be able to execute the electronic data outputting process, and
wherein the first processor is configured to transmit the second execution request to the second electronic device for requesting the second electronic device to execute the electronic data outputting process for the electronic data obtained from the data processing apparatus.

5. The service providing system as claimed in claim 1, wherein the electronic data outputting process includes one of printing data from an image forming apparatus, projecting data from a projector, and displaying data from a display device.

6. The service providing system as claimed in claim 1, wherein the portable terminal further includes a display unit, and
in a case where the first electronic device is determined to be unable to execute the scanning process, the first processor is configured to display, by way of the display unit, that the first electronic device is unable to execute the scanning process.

7. The service providing system as claimed in claim 1, wherein the portable terminal further includes a display unit, and
wherein in a case where the first electronic device is determined to be able to execute the scanning process, the first processor is configured to display, by way of the display unit, that the first electronic device is able to execute the scanning process.

8. The service providing system as claimed in claim 1, wherein the first electronic device determined as being able to execute the scanning process is a multifunction peripheral that includes a scanning function.

9. The service providing system as claimed in claim 1, wherein first one electronic device determined as being able to execute the scanning process is a scanner.

10. The service providing system as claimed in claim 1, wherein the first processor obtains the device data identifying the first electronic device after the selection of the scanning process is received.

11. A portable terminal comprising:
a first processor; and
a first memory that stores a first program;
wherein the first processor executes the first program to
receive selection of a scanning process or an electronic data outputting process,
display a screen including an area from which an image is taken with a camera function of the portable terminal after the selection is received,
obtain first device data from the image taken with the camera function when the screen is being displayed, the first device data identifying a first electronic device among multiple electronic devices, the first device data including capability data of the first electronic device,
determine whether the first electronic device is able to execute a selected one of the scanning process and the electronic data outputting process based on the capability data of the first electronic device included in the first device data obtained from the image taken with the camera function, and
transmit an execution request to the first electronic device for requesting the first electronic device to execute the scanning process in a case where the first capability data indicates that the first electronic device is able to execute the scanning process, wherein the first electronic device determined as being able to execute the scanning process is an electronic device that is external to the portable terminal.

12. The portable terminal as claimed in claim 11, wherein the first processor is configured to
transmit a second execution request to a data processing apparatus connected to the portable terminal for requesting a second electronic device among multiple electronic devices connected to the service providing system to execute the electronic data outputting process in a case where the capability data indicates that the second electronic device is able to execute the electronic data outputting process.

13. The portable terminal as claimed in claim 11, wherein the first processor is configured to
transmit a second execution request to a second electronic device among multiple electronic devices connected to the service providing system for requesting the second electronic device to execute the electronic data outputting process in a case where the second electronic device is determined to be able to execute the electronic data outputting process.

14. The portable terminal as claimed in claim 11, wherein the first electronic device determined as being able to execute the scanning process is a multifunction peripheral that includes a scanning function.

15. The portable terminal as claimed in claim 11, wherein the first electronic device determined as being able to execute the scanning process is a scanner.

16. The service providing system as claimed in claim 11, wherein the first processor obtains the device data identifying the first electronic device after the selection of the scanning process is received.

17. A non-transitory computer-readable recording medium on which a program is recorded for causing a processor of a portable terminal to execute a service providing method, the method comprising:
receiving selection of a scanning process or an electronic data outputting process;
display a screen including an area from which an image is taken with a camera function of the portable terminal after the selection is received,
obtaining first device data from the image taken with the camera function when the screen is being displayed, the first device data identifying a first electronic device among multiple electronic devices, the first device data including capability data of the first electronic device;
determining whether the first electronic device is able to execute the scanning process based on the capability data of the first electronic device included in the first device data obtained from the image taken with the camera function; and
transmitting an execution request to the one electronic device for requesting the first electronic device to execute the scanning process in a case where the capability data of the first electronic device indicates that the first electronic device is able to execute the scanning process, wherein the first electronic device determined as being able to execute the scanning process is external to the portable terminal.

18. The non-transitory computer-readable recording medium on which a program is recorded for causing a processor of a portable terminal to execute a service providing method as claimed in claimed 17, wherein the first electronic device determined as being able to execute the scanning process is a multifunction peripheral that includes a scanning function.

19. The non-transitory computer-readable recording medium on which a program is recorded for causing a processor of a portable terminal to execute a service providing method as claimed in claimed 17, wherein the first electronic device determined as being able to execute the scanning process is a scanner.

20. The service providing system as claimed in claim 17, wherein the device data identifying the first electronic device is obtained after the selection of the scanning process is received.

* * * * *